US 6,690,990 B1

(12) United States Patent
Caron et al.

(10) Patent No.: US 6,690,990 B1
(45) Date of Patent: Feb. 10, 2004

(54) METHOD OF OPTIMIZING A LAYOUT OF SELECTED PARTS TO BE CUT

(75) Inventors: Martin Caron, Sainte-Foy (CA); Pierre Coulombe, Sainte-Foy (CA)

(73) Assignee: Centre de Recherche Industrielle du Québec, Sainte-Foy (CA)

( * ) Notice: Subject to any disclaimer, the term of this patent is extended or adjusted under 35 U.S.C. 154(b) by 0 days.

(21) Appl. No.: 10/307,292

(22) Filed: Dec. 2, 2002

(51) Int. Cl.[7] ............................................. G06F 19/00
(52) U.S. Cl. .................... 700/171; 83/75.5; 144/39; 144/363
(58) Field of Search ................................ 700/171, 159; 144/39, 363, 367, 356; 83/75.5

(56) References Cited

U.S. PATENT DOCUMENTS

| | | | |
|---|---|---|---|
| 3,329,181 A | | 7/1967 | Buss et al. |
| 3,942,021 A | | 3/1976 | Barr et al. |
| 4,017,976 A | | 4/1977 | Barr et al. |
| 4,149,089 A | * | 4/1979 | Idelsohn et al. ............ 144/356 |
| 4,163,321 A | | 8/1979 | Cunningham |
| 4,221,974 A | | 9/1980 | Muller et al. |
| 4,794,963 A | * | 1/1989 | Openeer ..................... 83/75.5 |
| 4,805,679 A | | 2/1989 | Czinner |
| 5,262,956 A | * | 11/1993 | DeLeeuw ................... 700/171 |
| 6,463,402 B1 | * | 10/2002 | Bennett et al. ................ 703/2 |

OTHER PUBLICATIONS

Wiedenbeck, J.K. Deciding between Crosscut an and Rip–First processing, Wood and Wood products, Aug., 2001.
Thomas, R.E. et al., "Decision–support software for optimizing rip–first and chop–first system", Scan Pro, 8th international conference on scanning technology and process optimization for the wood products industry.
Thomas, R.E., "ROMI–RIP version 2.0: a new analysis tool for rip–first rough–mill operations", Forest Products Journal, vol.49 No. 5, pp 35–40, 1999.
Thomas, R.E., "ROMI–Cross: An analysis tool for cross-cut–first rough–mill operations", Forest Products Journal, vol.48, No.3, pp. 68–72.

* cited by examiner

Primary Examiner—Albert W. Paladini
(74) Attorney, Agent, or Firm—Jean-Claude Boudreau

(57) ABSTRACT

A method of optimizing a layout of selected parts to be cut from a piece of raw material such as wood, uses data representing geometric and defect-related characteristics of the each piece and data representing geometric and grade characteristics of a set of parts to be cut. A subset of parts characterized by a predetermined grade (quality) value and associated with a predetermined group of dimension values (width/length) is defined, as well as an arrangement of subdivided piece surface sections to be obtained through a primary cutting operation according to one or more of the width/length values. One or more subsections included in each piece surface section is defined according to the geometric and defect-related characteristics of the piece, and, for each subsection, a plurality of arrangements of parts to be included therein and selected from the subset of parts, to be obtained through a secondary cut operation, are defined. Then, yield values associated with the arrangements of parts are estimated, which are compared to select the arrangement of parts having a highest yield value. Hence, a basic yield value for the arrangement of subdivided piece surface sections is estimated, and the above optimization sequence repeated for one or more new arrangements of subdivided piece surface sections to estimate corresponding basic yield values, which are in turn compared one with another to select the arrangement of subdivided piece surface sections providing a maximal basic yield value to be included in the optimized layout of selected parts to be cut.

19 Claims, 29 Drawing Sheets

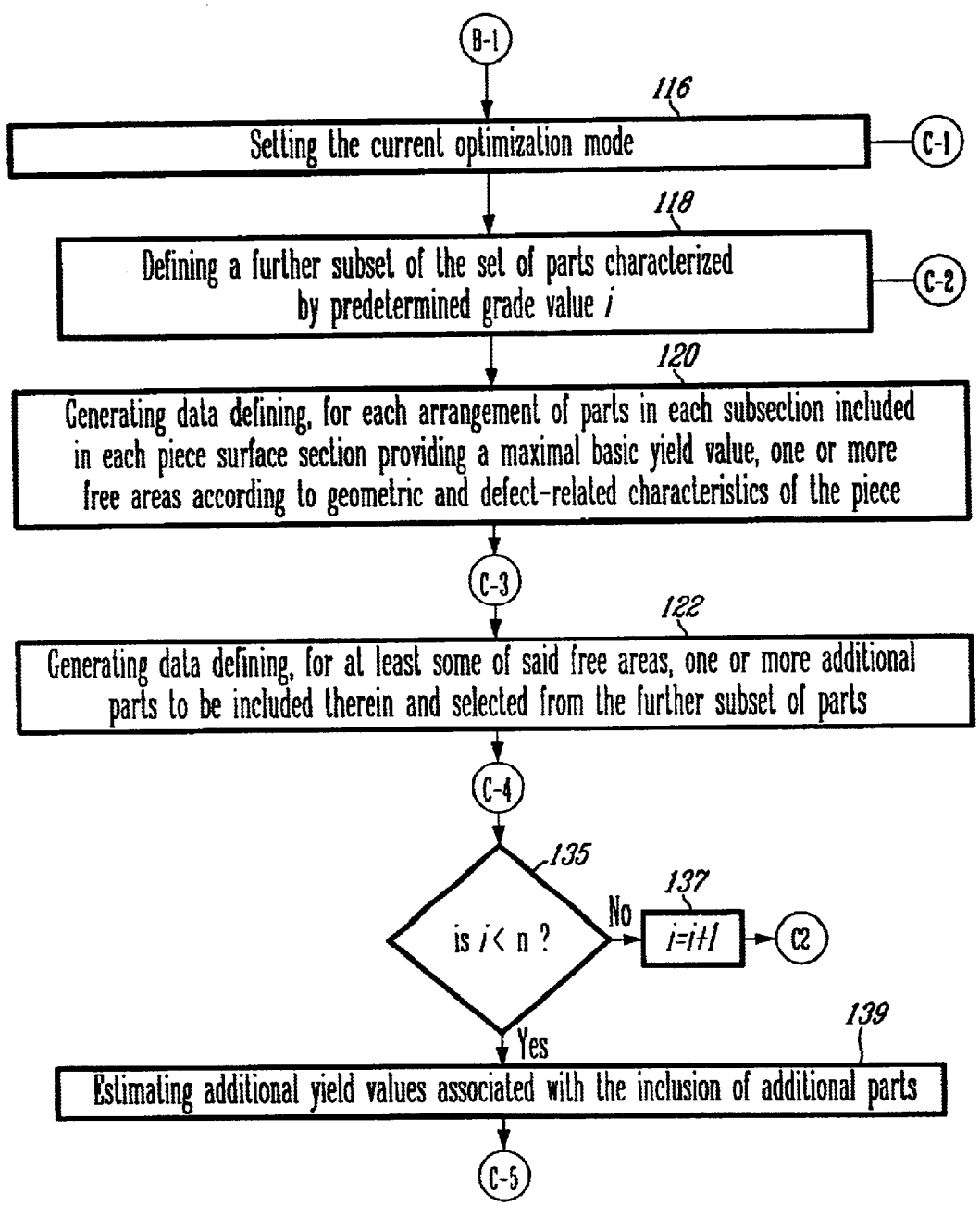

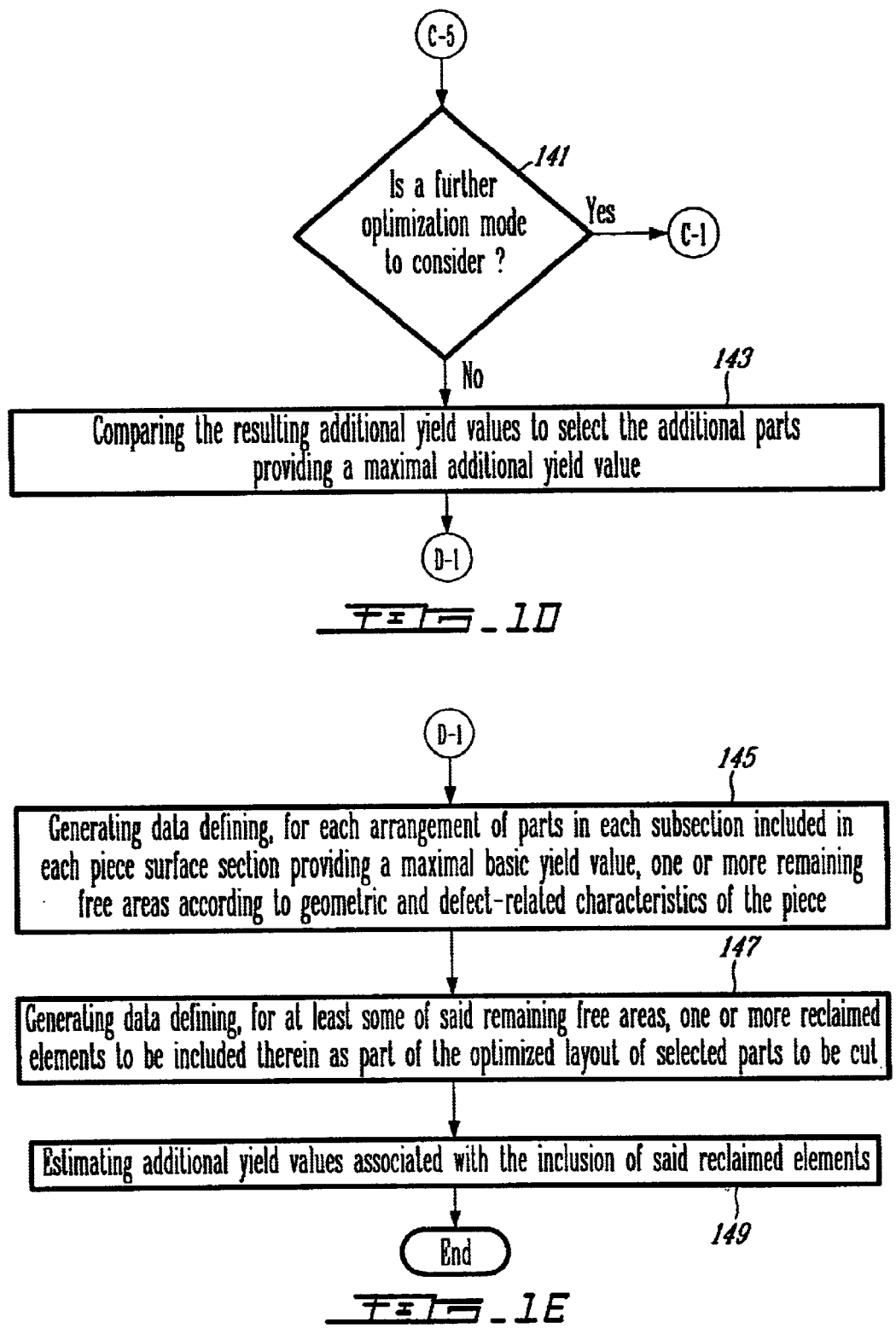

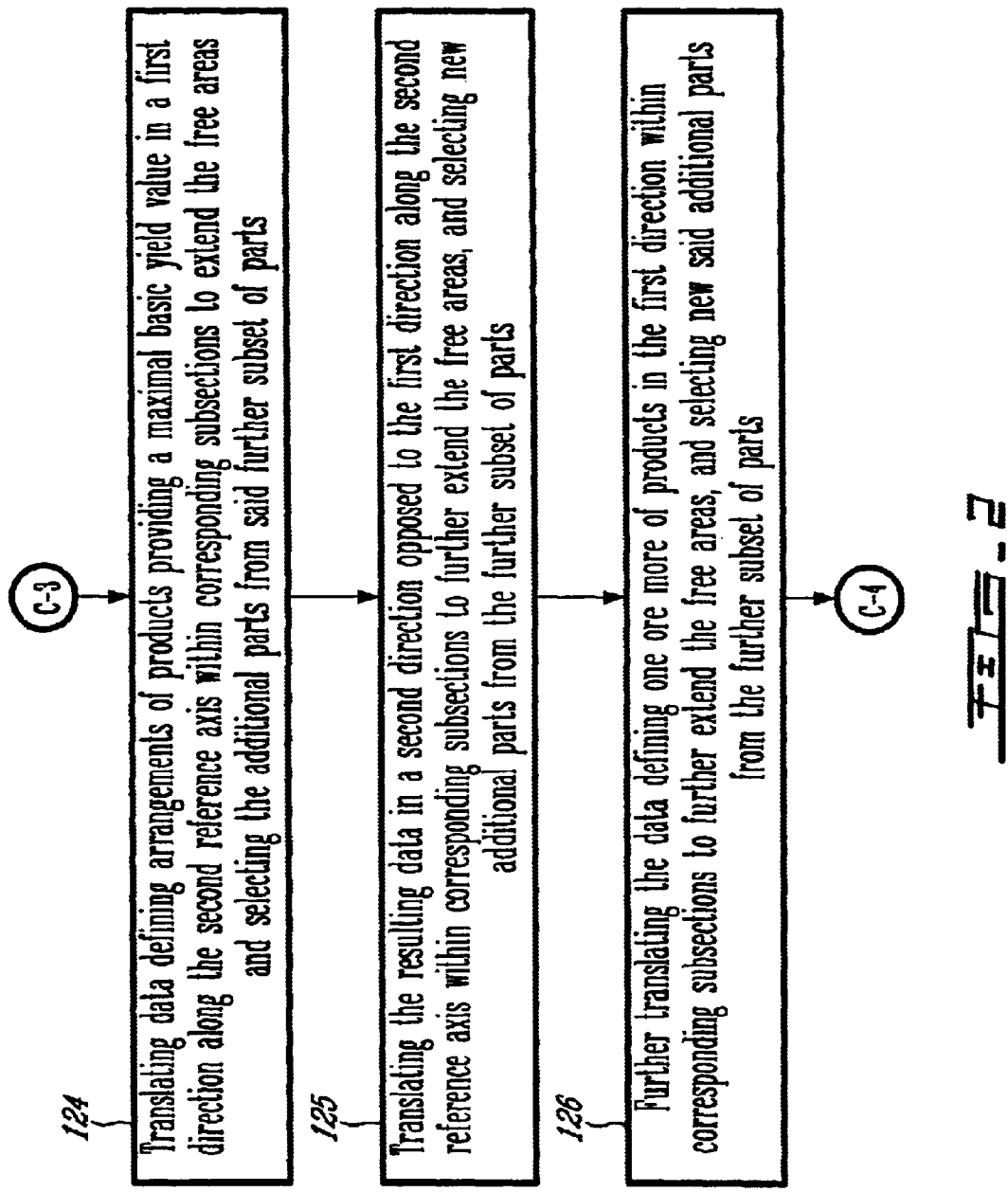

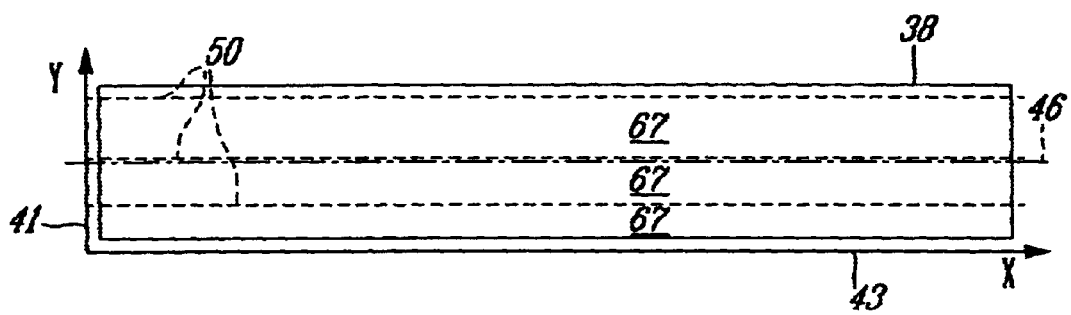
FIG_5A
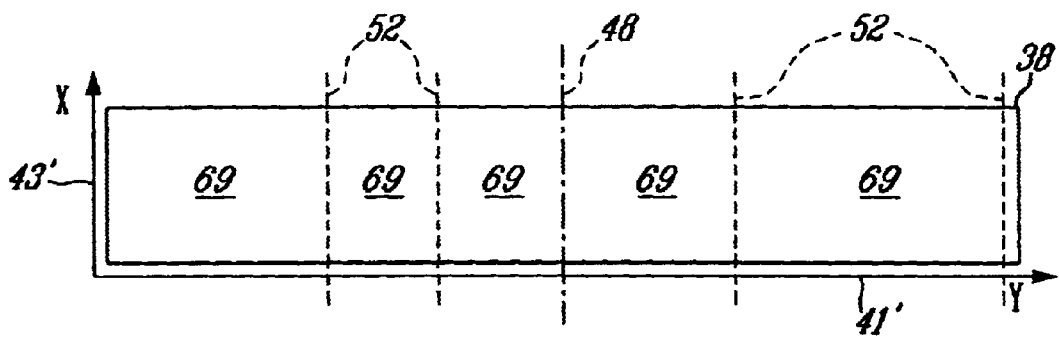
FIG_5B

File Operations Tools Display ? !

GRADES

| DEFECTS | CLEAR | CLEAR 1F | SUPERIOR | DARK | THIN | RECLAIMED |
|---|---|---|---|---|---|---|
| KNOT | Unacceptable | Unacceptable | Single-face | Unacceptable | Unacceptable | Unacceptable |
| WANE | Unacceptable | Unacceptable | Unacceptable | Unacceptable | Unacceptable | Unacceptable |
| COLORATION | Unacceptable | Single-face | Single-face | Acceptable | Acceptable | Acceptable |
| MISSING WOOD | Unacceptable | Unacceptable | Unacceptable | Unacceptable | Single-face | Acceptable |
| OPTIMIS PRIORITY | 1 | 2 | 3 | 4 | 5 | 6 |
| COLOR CODE | | | | | | |

FIG. 6

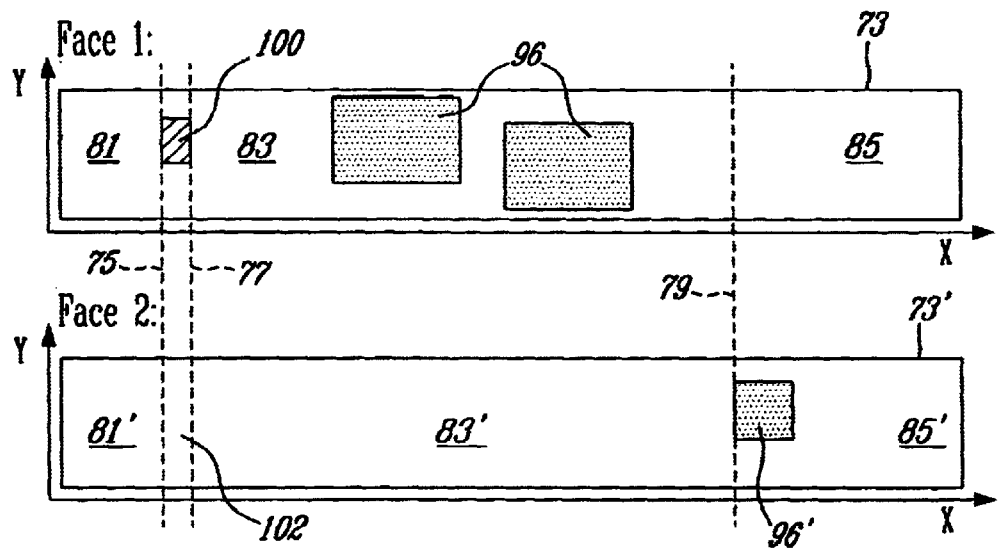
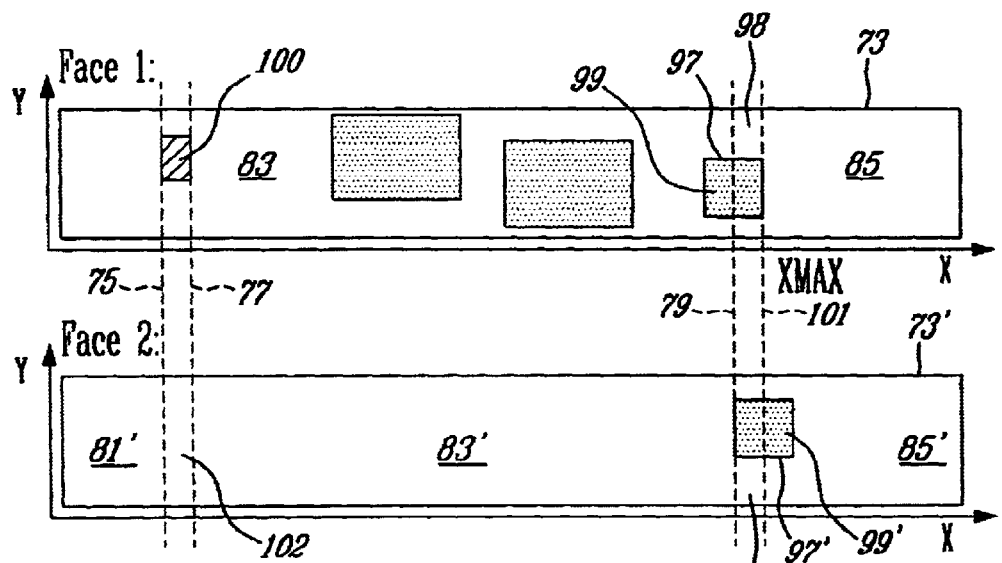

BOARD

Board No: 6  Width: 87 mm  surface: 211323 mm²
Length: 2459 mm  Final clear out: 2449 mm
Initial clear out: 20 mm
Number of defects: 8

| No | Xmin | Ymin | Xmax | Ymax | Face | Type |
|---|---|---|---|---|---|---|
| 1 | 8 | 40 | 13 | 42 | 1 | knot |
| 2 | 2052 | 1 | 2298 | 72 | 1 | coloration |
| 3 | 2301 | 51 | 2315 | 63 | 1 | knot |
| 4 | 2288 | 1 | 2453 | 85 | 1 | coloration |
| 5 | 8 | 33 | 14 | 82 | 2 | knot |
| 6 | 9 | 28 | 14 | 30 | 2 | knot |
| 7 | 245 | 1 | 555 | 84 | 2 | coloration |
| 8 | 2033 | 1 | 2279 | 89 | 2 | coloration |

FIG. 9

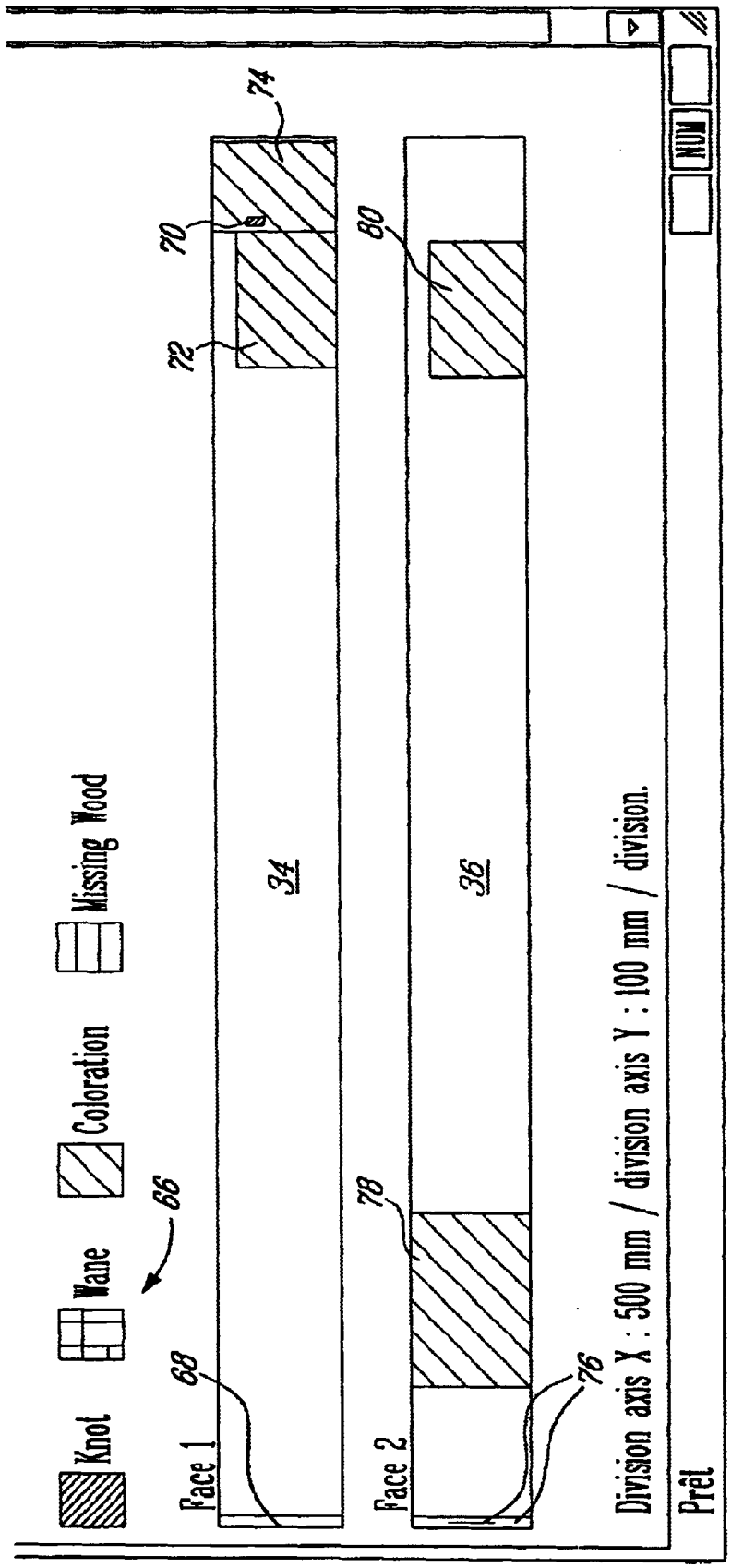
FIG. 9 (continue)

RIPPING SAWS

Length: 508 mm  Number of Saws: 8

| Number | Origin | Width | Kerf Width | Mobile |
|---|---|---|---|---|
| 1 | 0.00 mm | 25.40 mm | 4.00 mm | No |
| 2 | 29.40 mm | 31.75 mm | 4.00 mm | No |
| 3 | 65.15 mm | 50.80 mm | 4.00 mm | No |
| 4 | 119.95 mm | 37.50 mm | 4.00 mm | No |
| 5 | 161.45 mm | 25.40 mm | 4.00 mm | No |
| 6 | 190.85 mm | 50.80 mm | 4.00 mm | No |
| 7 | 245.65 mm | 76.20 mm | 4.00 mm | No |
| 8 | 325.85 mm | 0.00 mm | 4.00 mm | No |

FIG. 11

CUTTING BILL

Number of lengths : 18

| Length | Width | Type | Requested Quantity | Remain Quantity | Remain Quantity | Grade | Production | Code | Priority | Weight Factor | Price | Active | Inf. |
|---|---|---|---|---|---|---|---|---|---|---|---|---|---|
| 1905 mm | 0 mm | Panel | 2032 mm | 2032 mm | 100.00 | Dark | 090 | P7504F | 6 | 1.00 | 1333.50 | Yes | No |
| 1905 mm | 0 mm | Panel | 2032 mm | 2032 mm | 100.00 | clear 1F | 090 | P7504 | 7 | 1.00 | 1714.50 | Yes | No |
| 1851 mm | 0 mm | Panel | 2032 mm | 2032 mm | 100.00 | clear 1F | 091 | P6504 | 17 | 1.00 | 1435.90 | Yes | No |
| 1473 mm | 48 mm | component | 5 | 5 | 0.00 | Dark | 090 | C4012F | 15 | 1.00 | 76.13 | Yes | No |
| 1473 mm | 48 mm | component | 4 | 4 | 0.00 | clear 1F | 090 | C4012C | 16 | 1.00 | 97.88 | Yes | No |
| 1448 mm | 0 mm | Panel | 508 mm | 508 mm | 100.00 | clear 1F | 090 | P5704 | 11 | 1.00 | 1303.02 | Yes | No |
| 1448 mm | 0 mm | Panel | 1016 mm | 1016 mm | 100.00 | Dark | 090 | P5704F | 13 | 1.00 | 1013.46 | Yes | No |
| 1245 mm | 0 mm | Panel | 1524 mm | 1524 mm | 100.00 | clear | 091 | P4904 | 20 | 1.00 | 1244.60 | Yes | No |
| 1245 mm | 0 mm | Panel | 3556 mm | 3556 mm | 100.00 | clear 1F | 091 | P4904 | 20 | 1.00 | 1120.14 | Yes | No |
| 1245 mm | 0 mm | Panel | 5588 mm | 5588 mm | 100.00 | Dark | 091 | P4904F | 21 | 1.00 | 871.22 | Yes | No |
| 1118 mm | 80 mm | component | 1 | 1 | 0.00 | clear 1F | 091 | C4053C | 3 | 1.00 | 94.05 | Yes | No |
| 1118 mm | 79 mm | component | 1 | 1 | 0.00 | clear 1F | 091 | C4127C | 12 | 1.00 | 123.75 | Yes | No |
| 1118 mm | 59 mm | component | 4 | 4 | 0.00 | clear 1F | 091 | C4010? | 3 | 1.00 | 91.58 | Yes | No |
| 1118 mm | 60 mm | component | 3 | 3 | 0.00 | Dark | 091 | C4053F | 4 | 1.00 | 73.15 | Yes | No |

FIG. 14

| | | | | | | | | | | |
|---|---|---|---|---|---|---|---|---|---|---|
| 1118 mm | 79 mm | component | 1 | 1 | 0.00 | Dark | 091 | C4127F | 13 | 1.00 | 96.25 | Yes | No |
| 1118 mm | 48 mm | component | 3 | 3 | 0.00 | clear 1F | 090 | C4213C | 18 | 1.00 | 74.25 | Yes | No |
| 1118 mm | 48 mm | component | 6 | 6 | 0.00 | Dark | 090 | C4213F | 19 | 1.00 | 57.75 | Yes | No |
| 1118 mm | 0 mm | Panel | 1016 mm | 1016 mm | 100.00 | clear 1F | 091 | P4404 | 1 | 1.00 | 1117.60 | Yes | No |
| 1118 mm | 0 mm | Panel | 12192 mm | 12192 mm | 100.00 | clear | 091 | P4404 | 1 | 1.00 | 1005.84 | Yes | No |
| 1118 mm | 0 mm | Panel | 3048 mm | 3048 mm | 100.00 | Dark | 091 | P4404F | 4 | 1.00 | 782.32 | Yes | No |
| 1054 mm | 0 mm | Panel | 29464 mm | 29464 mm | 100.00 | clear 1F | 090 | P4104 | 1 | 1.00 | 948.89 | Yes | No |
| 1054 mm | 0 mm | Panel | 1016 mm | 1016 mm | 100.00 | clear | 091 | P4104 | 9 | 1.00 | 1041.40 | Yes | No |
| 1054 mm | 0 mm | Panel | 8128 mm | 8128 mm | 100.00 | Dark | 091 | P4104F | 10 | 1.00 | 728.98 | Yes | No |
| 1041 mm | 60 mm | component | 1 | 1 | 0.00 | clear 1F | 091 | C4055C | 1 | 1.00 | 87.64 | Yes | No |
| 1041 mm | 60 mm | component | 21 | 21 | 0.00 | Dark | 091 | C4055F | 2 | 1.00 | 68.16 | Yes | No |
| 1041 mm | 60 mm | component | 2 | 2 | 0.00 | clear 1F | 091 | C4301C | 9 | 1.00 | 85.50 | Yes | No |
| 1016 mm | 0 mm | Panel | 2032 mm | 2032 mm | 0.00 | Dark | 091 | C4301F | 11 | 1.00 | 66.50 | Yes | No |
| 889 mm | 0 mm | Panel | 3048 mm | 3048 mm | 100.00 | clear 1F | 091 | P3504 | 20 | 1.00 | 800.10 | Yes | No |
| 889 mm | 0 mm | Panel | | | 100.00 | Dark | 091 | P3504F | 21 | 1.00 | 622.30 | Yes | No |

FIG_14 (continue)

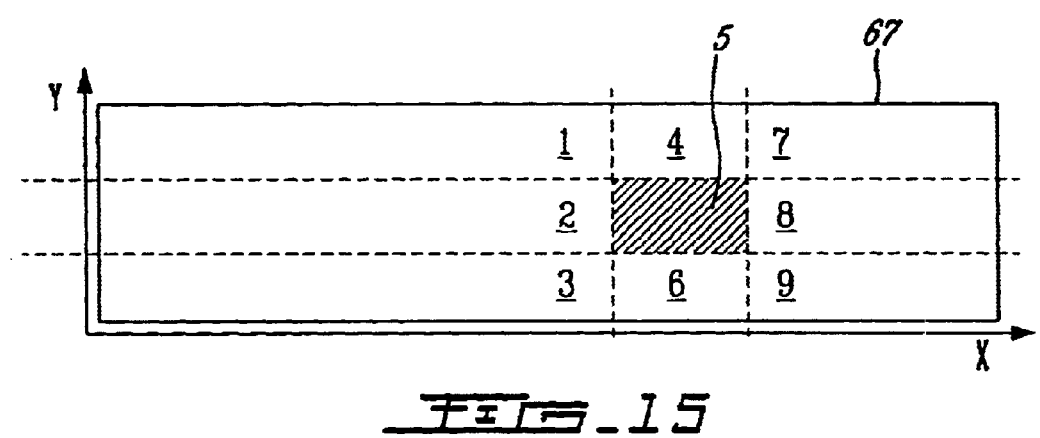
FIG_15

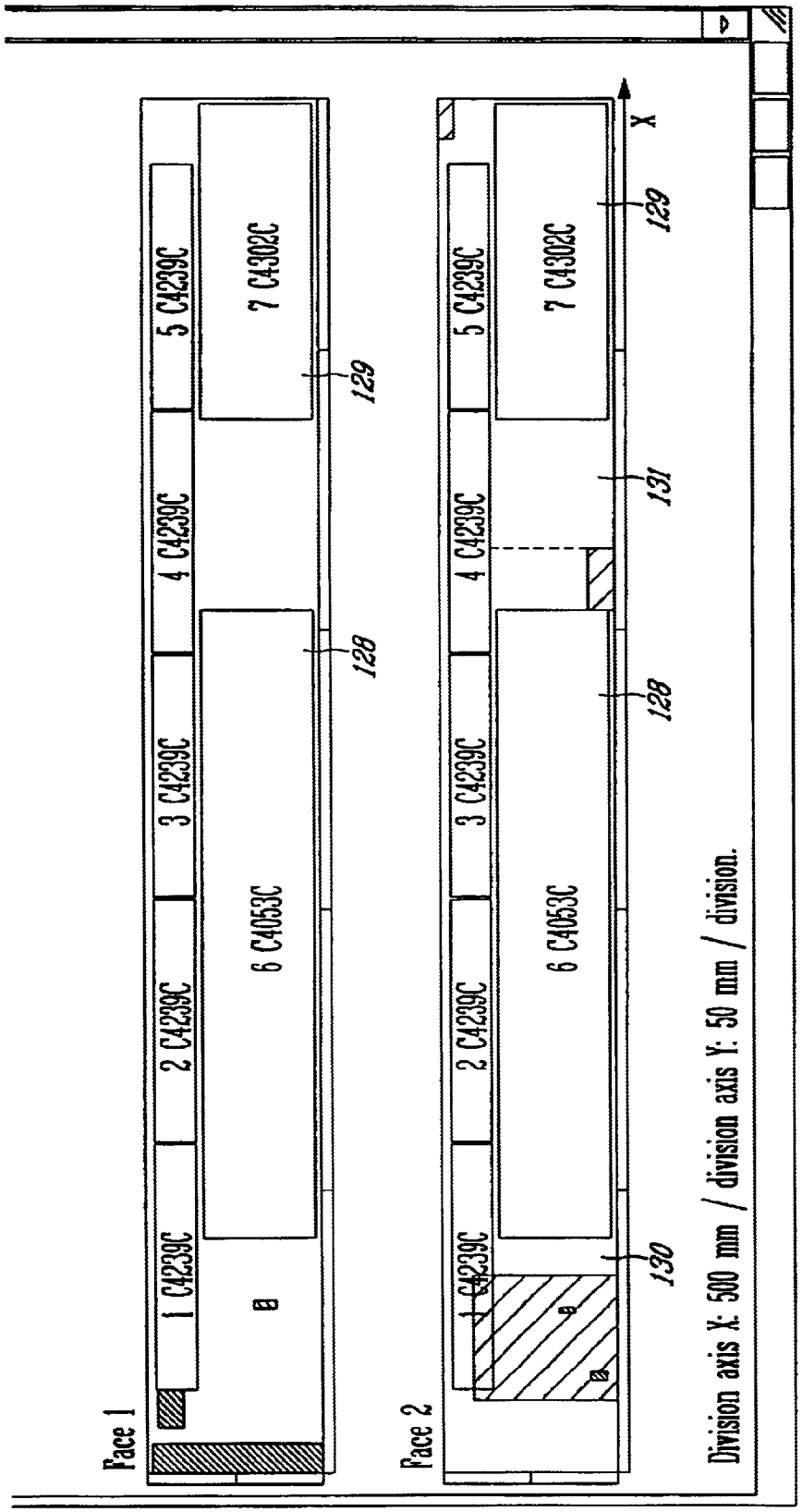
FIG. 16 (continue)

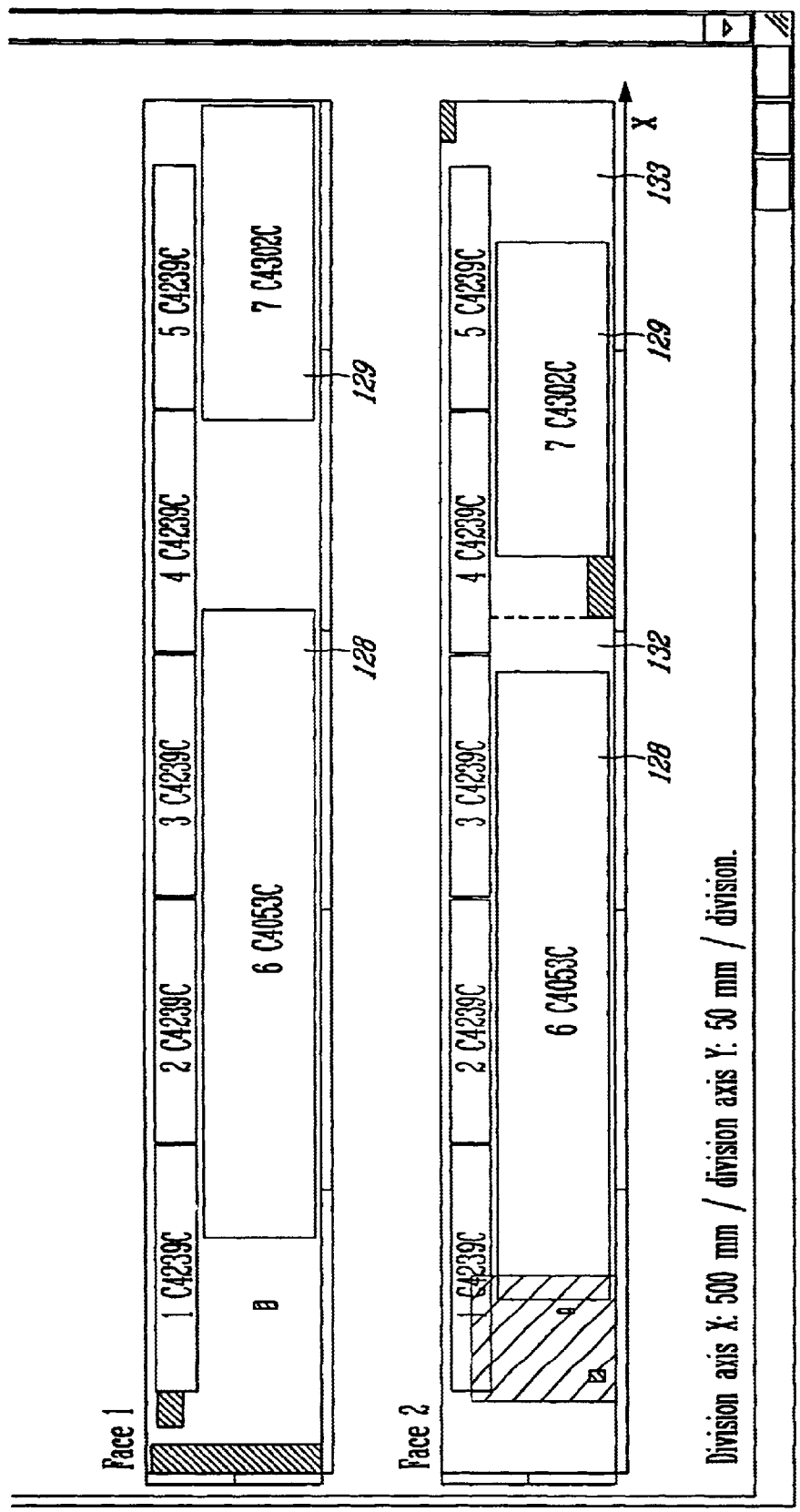
FIG. 17 (continue)

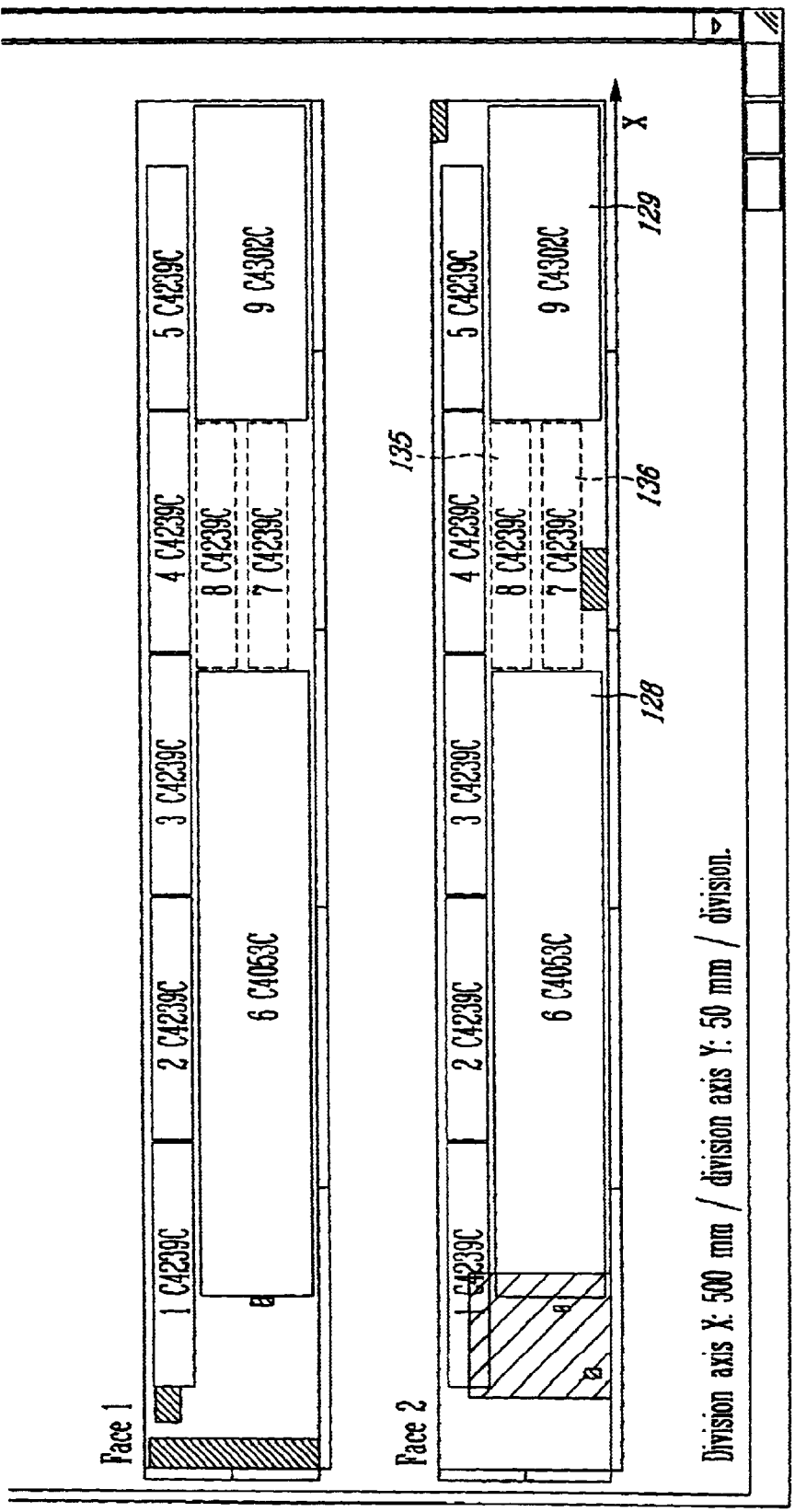
FIG. 18 (continue)

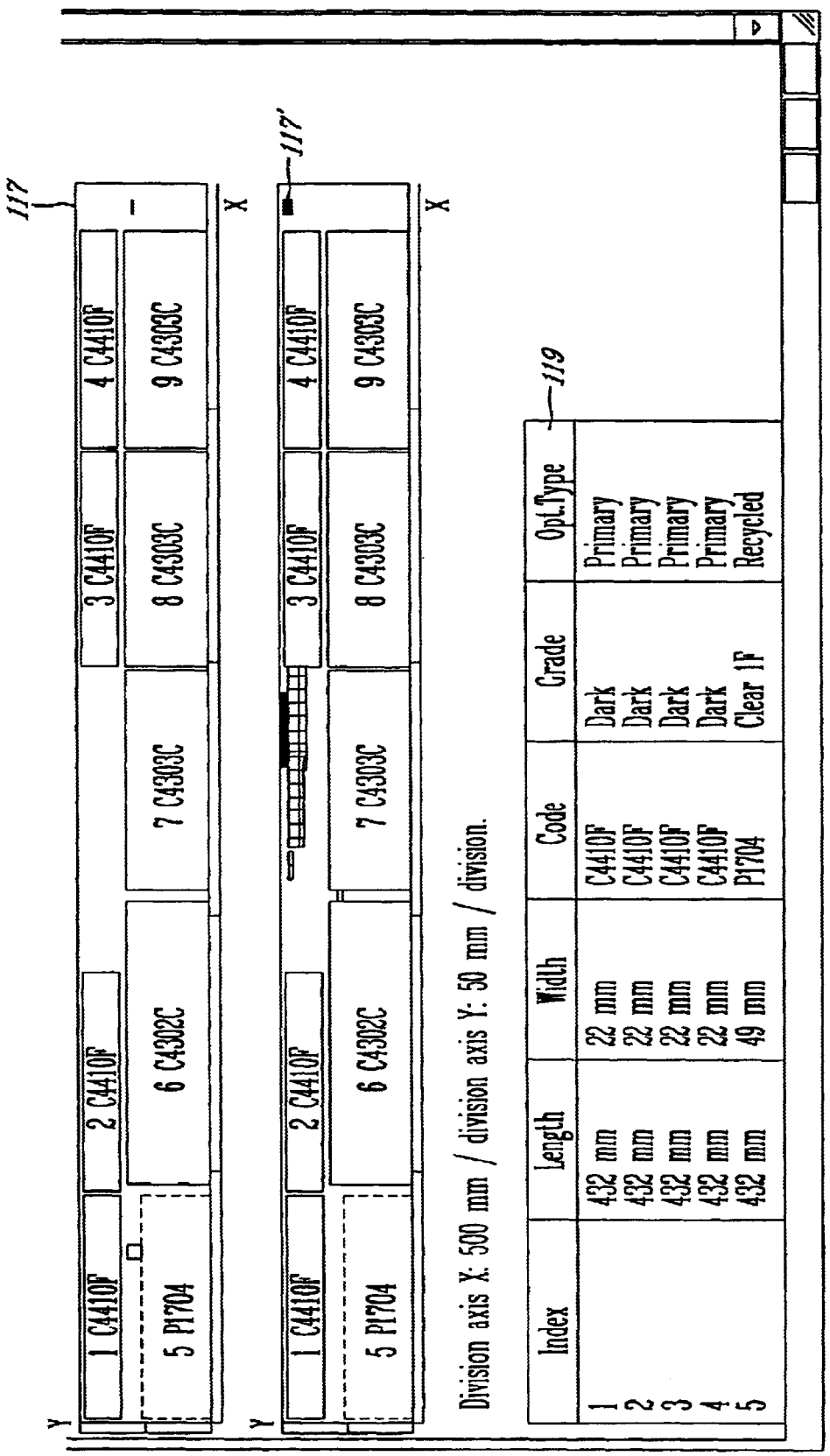
FIG. 19 (continue)

File Operations Tools Display ? :

SIMULATION RESULTS

| | |
|---|---|
| Name of simulation | Simulation-1 |
| Surface of Plank | 230582 mm² |
| Surface of Defects | 7009 mm² |
| Selected Grade | Clear 1F |
| Optimisation mode | RIP First |
| Primary Yield (%) | 65.684970 |
| Recycled Yield (%) | 9.251213 |
| Reclaimed Yield (%) | 0.000000 |
| Total Yield (%) | 74.936183 |
| Price ($) | 167692.910000 |
| | |
| Selected Grade | clear |
| Surface Potential | 0 mm² |
| Potential Yield (%) | 0.000000 |
| Surface Generated | 0 mm² |
| Yield | 0.000000 |

FIG_20

| | |
|---|---|
| Selected Grade | Clear 1F |
| Surface Potential | 0 mm² |
| Potential Yield (%) | 0.000000 |
| Surface Generated Yield | 133003 mm²<br>58.155615 |
| | |
| Selected Grade | Superior |
| Surface Potential | 0 mm² |
| Potential Yield (%) | 0.000000 |
| Surface Generated Yield | 0 mm²<br>0.000000 |
| | |
| Selected Grade | Dark |
| Surface Potential | 0 mm² |
| Potential Yield (%) | 0.000000 |
| Surface Generated Yield | 38377 mm²<br>16.780568 |

FIG. 20 (continue)

PRODUCTION RESULTS

Name of simulation: Simulation-1
Optimization mode: Hybrid Rip-First
Number of Boards: 4

Number of products: 265
Input Surface: 807111.99 mm²
Surface Generated: 550881.33 mm²

Monetary Value ($): 41.46

| Code | Type | Quantity | Surface | Surface (%) | Input Surface |
|---|---|---|---|---|---|
| P404 | Panel | 20 | 22352.00 mm² | 4.06 | 2.77 |
| P4904 | Panel | 32 | 39827.20 mm² | 7.23 | 4.93 |
| P2104 | Panel | 38 | 20269.20 mm² | 3.68 | 2.51 |
| P1704 | Panel | 158 | 68224.40 mm² | 12.38 | 8.46 |
| C4012C | Component | 1 | 70161.15 mm² | 12.74 | 8.69 |
| C4302C | Component | 1 | 33709.61 mm² | 6.12 | 4.18 |
| C4053C | Component | 1 | 67419.22 mm² | 12.24 | 8.35 |
| C4065C | Component | 2 | 82903.10 mm² | 11.42 | 7.79 |
| C4303C | Component | 3 | 78145.00 mm² | 14.19 | 9.68 |
| C4410C | Component | 4 | 38387.02 mm² | 5.97 | 4.76 |
| C4239C | Component | 5 | 47963.77 mm² | 8.71 | 5.95 |
| Reclaim | Reclaim | 0 | 0.00 mm² | 0.00 | 0.00 |

FIG. 21

METHOD OF OPTIMIZING A LAYOUT OF SELECTED PARTS TO BE CUT

FIELD OF THE INVENTION

The present invention relates generally to the field of product manufacturing optimization, and more particularly to methods for optimizing a layout of selected parts to be cut from pieces of raw material, such as employed in the lumber processing industry.

BRIEF DESCRIPTION OF THE BACKGROUND ART

Product manufacturing optimization techniques have been developed during the past years to improve productivity associated with industrial processes such as manual and automated part cutting or sawing. Generally, such optimization techniques allow the determination of the arrangement of parts that provides the highest yield in terms of raw material usage and/or economic value from a given piece of raw material characterized by the presence of defects that have previously been qualified and located by spatial coordinates within a reference system, which can be either bi-dimensional or tri-dimensional to consider the two opposed main faces of the piece of raw material or the two pairs of opposed surfaces, depending upon the specific application considered. Typically, information about a set of parts to be cut from a piece of raw material is defined by a processing bill or order, which information includes requested quantities for each type of parts, quality grade associated to each requested product, geometrical characteristics such as length and width, unit cost, identification code, etc. Product cutting optimization is usually performed by a computer software which seeks to comply with a requested quantity of parts as set by the cutting bill, while optimizing the spatial arrangement of requested parts in order to maximize raw material usage and/or economic value obtained from the piece of raw material employed. Typically, an optimization software may provide production information details such as raw material yield, economic value yield or pricing, cutting layout, parts distribution, required number of cut operations, etc. Known optimization computer software is typically designed to be integrated into production equipment such as automated sawmill machinery or to be used as stand-alone systems for performing simulation from production data. In lumber processing, especially regarding hardwood cutting into wooden products such furniture components, panels and flooring pieces, crosscut-first rough mill operation has been considered as the main type of cutting process. However, shortage in large pieces of timber, raw material pricing increase and trends in the lumber industry toward diversified products as well as higher production rates have oriented some sawing mills toward rip-first cutting processes, so that both crosscut-first and rip-first processes are now basic sawing processes employed in existing sawing mills. Crosscut-first and rip-first processes having their respective advantages and drawbacks, and depending upon the production context within which they are applied, product cutting performance observed for each of these main processing approaches may vary, rendering the task of cutting process selection a quite difficult one, as extensively discussed in the literature, such by Wiedenbeck, J. K. in "Deciding between Crosscut and Rip-first processing", Wood and Wood Products, August, 2001. Generally, rip-first process provides efficient elimination of defect areas adjacent the edges of the raw material piece, being more easily eliminated within a single section, while cross-cut process provides efficient elimination of defect areas that are located over a short length portion of the piece by removing the whole defective portion. Most of the usual sawing processes favours the segmentation of each piece into a plurality of sections, such as rip-cut or crosscut sections, optimizing raw material surface according to a first reference axis, as discussed by Thomas, R. E. in "ROMI-RIP version 2.0: a new analysis tool for rip-first rough mill operations", Forest Products Journal, vol. 49, no.5, p. 35–40, 1999. Such sections are then further processed to eliminate defect areas while complying with dimensional requirements, such as discussed by Thomas, R. E. et al in "Decision-support software for optimizing rip-first and chop-first systems" Scan Pro, $8^{th}$ international conference on scanning technology and process optimization for the wood products industry. Flooring wood processing, which is a particular type of rip-first process wherein length dimension is undefined in cutting bills, and panel processing, which is a particular type of cross-first process wherein width dimension is undefined, both offer advantages relevant to one-dimensional freedom axis for arranging parts. such one-axis optimization technique is disclosed in U.S. Pat. No. 4,221,974 entitled "Lumber inspection and optimization system" issued Sep. 9, 1990 to Muller et al. Another one-axis optimization method is disclosed in U.S. Pat. No. 4,163,321 entitled "Method for sequencing the cutting of elongated stock" issued to Cunningham on Aug. 7, 1979. There is disclosed a method for cutting optimization of elongated stock such as boards of lumber having random unusable lengths containing defects, which method involves products order requirements, waste factors determination, probability assessment of having a given length of usable stock in each grade being processed, and from the information above, determination of the arrangement of parts to be cut at one time which results in the lowest waste for the entire cutting. Another known one-axis optimization method is disclosed in U.S. Pat. No. 4,017,976 entitled "Apparatus and method for maximum utilization of elongated stock" issued to Barr and al on Apr. 19, 1977, which employs a yield optimization approach for crosscutting of usable lengths of stock such as boards of lumber having random unusable lengths containing defects, wherein lengths of stock required are determined, information describing the required lengths is stored, a value factor for each required length is calculated and stored as well as statistical data describing usable lengths in various grades of stock, information on various grades proportions being processed is stored, priority factors to increase the probability of cutting desired lengths are determined and stored, and finally, based on the information above, the positions of the backgauge indicators are calculated, which represent optimum possible combinations of lengths for each usable length which can be cut into the desired lengths, which position indicators are printed in full scale on a continuous sheet of paper.

In order to improve the performance of optimization over known one-axis techniques, two-axis optimization methods and software have been developed, such as rip-first software discussed by Thomas, R. E. in "ROMI-RIP version 2.0: a new analysis tool for rip-first rough mill operations", Forest Products Journal, vol. 49, no.5, p. 35–40, 1999, as well as crosscut-first software also discussed by Thomas in "ROMI-CROSS: An analysis tool for crosscut-first rough mill operations", Forest Products Journal, Vol. 48, no. 3, pp. 68–72. Such optimization systems allow the generation of an optimal cutting solution which consider two reference optimization axis simultaneously, which solution includes data on selected arrangements of parts, cutting position as well as output yield. ROMI-RIP and ROMI-CROSS are two-axis optimization software products performing successive optimization steps considering quality/grades of products as defined in the cutting bill, from the highest grade to the lowest grade. A similar two-axis optimization technique is disclosed in U.S. Pat. No. 3,329,181 entitled "Apparatus and method for cutting assorted lengths from material having irregular and random defects" issued Jul. 4, 1967 to Buss and al. Another two-axis optimization technique is disclosed in U.S. Pat. No. 4,805,679 issued to Czinner on Feb. 21, 1989, which makes use of an expert system for performing the optimization task. Another two-axis apparatus for optimizing the yield of usable piece from boards and the like is disclosed in U.S. Pat. No. 3,942,021 issued to Barr and al on Mar. 2, 1976, which adopts a yield optimization approach wherein a primary bit matrix corresponding to a pattern of scanned unusable defect containing areas of a processed board of lumber, is formed and stored in computer. Predetermined combinable unusable defect containing areas as well as predetermined combinable unusable non-defect containing areas are identified from the primary bit matrix, and the identified combinable unusable defect and non-defect containing areas are merged to produce a list defining a pattern characterizing usable areas. Predetermined billing requirements are established and stored, various cutting patterns for the workpiece are successively determined on the basis of usable area information and billing requirements, and the cutting pattern producing the optimum yield for a workpiece is selected.

Although considered as a promising alternative to conventional one-axis optimization systems in use by roughmill operations, most of existing two-axis optimization systems are conceived on the basis of optimization methods that do not provide sufficient flexibility to ensure maximum optimization performance in specific applications, and therefore, they have not yet achieved general acceptance within the lumber industry.

BRIEF SUMMARY OF THE INVENTION

It is therefore a main object of the present invention to provide a method of optimizing a layout of selected parts to be cut which allows flexibility of use while ensuring reliable optimization results.

According to the above object, from a broad aspect, there is provided a method of optimizing a layout of selected parts to be cut from a piece of raw material with respect to first and second orthogonal reference axis, using data representing geometric and defect-related characteristics of said piece and data representing geometric and grade characteristics of a set of parts to be cut. The method comprises the steps of: i) defining a subset of the set of parts characterized by a predetermined grade value and associated with a predetermined group of first dimension values defined with respect to the first axis; ii) generating data defining an arrangement of subdivided piece surface sections to be obtained through a primary cut operation with respect to the second reference axis and according to one or more of the first dimension values; iii) generating data defining one or more subsections included in each piece surface section according to the geometric and defect-related characteristics of the piece; iv) generating data defining for each subsection a plurality of arrangements of parts to be included therein and selected from the subset of parts, to be obtained through a secondary cutting operation with respect to the first reference axis; v) estimating yield values associated with the arrangements of parts; vi) comparing the yield values to select one of the arrangements of parts having a highest yield value; vii) estimating a basic yield value the arrangement of subdivided piece surface sections; viii) repeating steps ii) to vii) for one or more new arrangements of subdivided piece surface sections to estimate corresponding basic yield values; and ix) comparing all basic yield values one with another to select the arrangement of subdivided piece surface sections associated with the arrangements of parts providing a maximal basic yield value to be included in the optimized layout of selected parts to be cut.

According to the same main object, from a further broad aspect of the invention, there is provided a software product data recording medium in which program code is stored, which program code will cause a computer to perform a method of optimizing a layout of selected parts to be cut from a piece of raw material with respect to first and second orthogonal reference axis, using data representing geometric and defect-related characteristics of said piece and data representing geometric and grade characteristics of a set of parts to be cut, wherein the method comprises the steps of: i) defining a subset of the set of parts characterized by a predetermined grade value and associated with a predetermined group of first dimension values defined with respect to the first axis; ii) generating data defining an arrangement of subdivided piece surface sections to be obtained through a primary cut operation with respect to the second reference axis and according to one or more of the first dimension values; iii) generating data defining one or more subsections included in each piece surface section according to the geometric and defect-related characteristics of the piece; iv) generating data defining for each subsection a plurality of arrangements of parts to be included therein and selected from the subset of parts, to be obtained through a secondary cutting operation with respect to the first reference axis; v) estimating yield values associated with the arrangements of parts; vi) comparing the yield values to select one of the arrangements of parts having a highest yield value;,:vii) estimating a basic yield value the arrangement of subdivided piece surface sections; viii) repeating steps ii) to vii) for one or more new arrangements of subdivided piece surface sections to estimate corresponding basic yield values; and ix) comparing all basic yield values one with another to select the arrangement of subdivided piece surface sections associated with the arrangements of parts providing a maximal basic yield value to be included in the optimized layout of selected parts to be cut.

BRIEF DESCRIPTION OF THE DRAWINGS

A preferred embodiment of a method of optimizing a layout of selected parts according to the present invention will now be described in detail with respect to the accompanying drawings in which:

FIG. 1c is a process flow diagram complementary to the diagram of FIG. 1b, representing a sequence of steps associated with a recycling function of the method according to the preferred embodiment, according to which one or more additional parts to be included in free areas of a piece sub-section are selected from a further subset of parts;

FIG. 1*d* is a process flow diagram complementary to the diagram of FIG. 1*c*, representing a case where a further optimization mode is considered to perform the recycling function;

FIG. 1*e* is a process flow diagram complementary to the diagram of FIG. 1*d*, representing the method steps associated with a reclaiming function provided in the preferred embodiment of the optimization method according to the invention;

FIG. 2 is a process flow diagram defining a sequence of method steps included in the additional product data-generating step represented on FIG. 1*c*;

FIGS. 5*a* and 5*b* are schematic representations of pieces of lumber showing arrangements of subdivided piece surface sections according to a first, rip-first optimization mode and a second, crosscut-first optimization mode, respectively;

FIG. 6 represents a graphical display screen generated by computer software, showing a table giving characteristic data related to a plurality of predetermined grades that can be considered in a given simulation process;

FIG. 7 is a schematic representation of a piece of lumber characterized by the presence of several defect areas of different types as found on the two opposed main surfaces of the piece of lumber;

FIG. 8 is a schematic representation of another piece of lumber characterized by several defect areas appearing on opposed faces thereof, in which a further subsection is generated considering a single-face acceptable defect criterion;

FIG. 9 represents a main graphical display screen as generated by computer software implementing the method according to the invention, showing piece related data;

FIG. 11 represents a graphical display screen generated by computer software, showing position information related to a plurality of ripping saws that may be used in conjunction with the method according to the present invention, to perform a primary or secondary cutting operation, depending upon the selected optimization mode;

FIG. 14 represents a graphical display screen generated by computer software, showing the list of parts to be cut according to a specific cutting bill entered into the computer, giving information concerning each part of the list;

FIG. 15 is a schematic representation of a piece of lumber section on which a selected product has been placed according to the optimization process of the invention, showing surrounding areas likely to receive additional parts according to a recycling approach;

FIG. 20 represents a graphical display screen generated by computer software, giving a list of parameters related the current simulation process, including resulting yield data for each grade considered; and FIG. 21 represents a graphical display screen generated by the computer software, showing a table containing production data related to each part included in the cutting bill.

DETAILED DESCRIPTION OF THE PREFERRED EMBODIMENTS

Figure 1A:
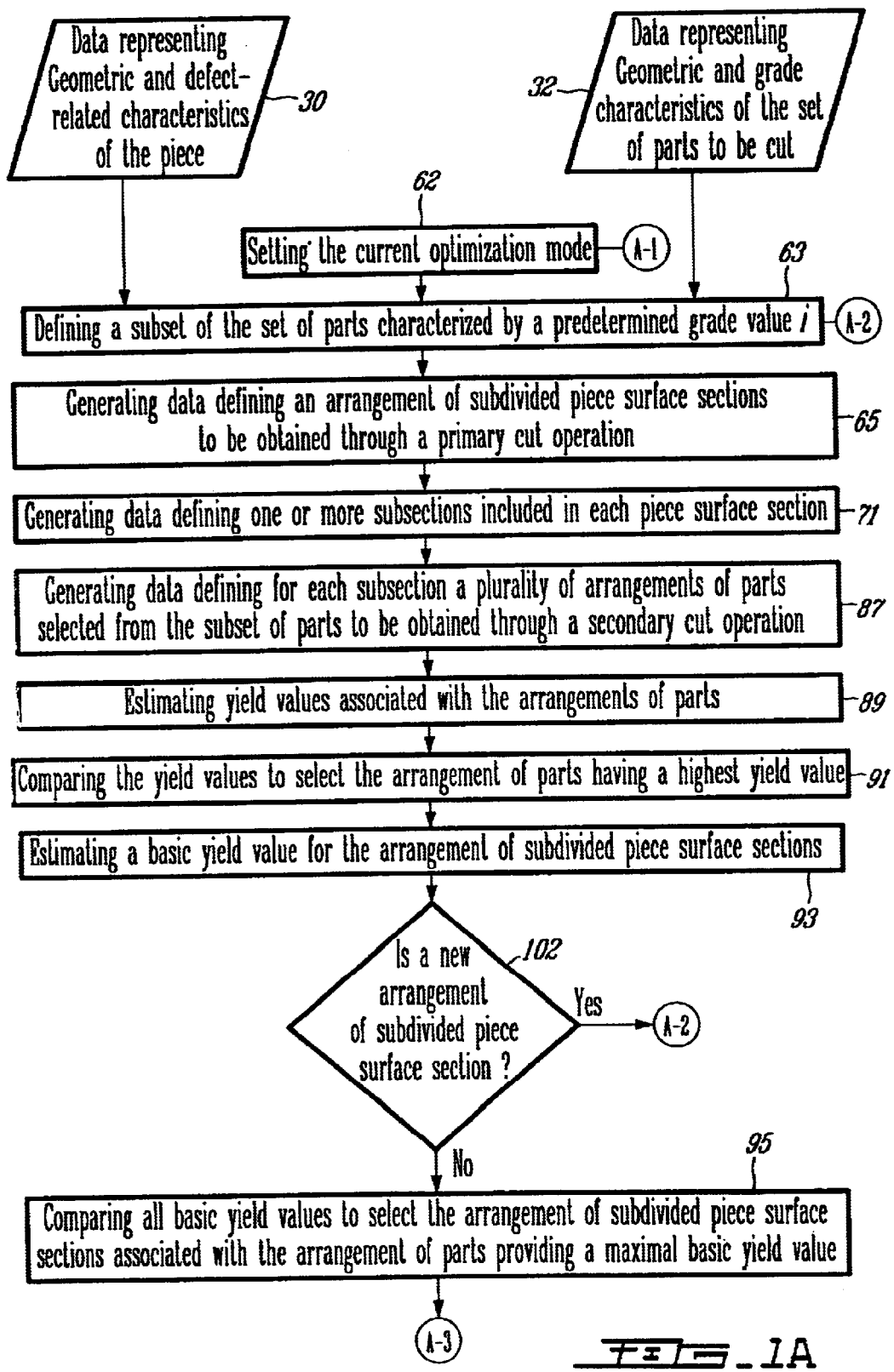
FIG. 1a is a process flow diagram representing the main method steps as part of the preferred embodiment of the method according to the invention.

Referring now to FIG. 1*a*, a method of optimizing a layout of selected parts to be cut in accordance with the present invention will now be described in detail, in the context of a preferred field of application concerning lumber processing. However, it is to be understood that the method according to the present invention can also be advantageously employed for performing cutting optimization in other manufacturing contexts involving various types of raw material, such as paper, glass, fabric, plastic or rubber materials, whenever cutting patterns with respect to orthogonal reference axis are contemplated, along with geometric and grade characteristics of the set of parts to be cut. It is also to be understood that although the particular example to which the following detailed description refers involves elongated pieces of lumber such as boards, other types of wood raw material can be the object of the optimization method according to the invention, such as plywood or other kinds of wooden pressed panels. The two-axis optimization method according to the invention allows finding the best arrangement of parts within a layout adapted to match a specific piece of lumber having predetermined known dimensions and characterized by the presence of defects, whose location as well as type are also known in the form of data stored in computer memory. The parts to be cut all originate from a processing bill or order, representing production requirements determined from either manufacturing of commercial needs as defined, for example, by the production plant manager. The main function of the optimization method is to identify an arrangement of parts complying with requested quantity as set out by the cutting bill while seeking to recover residual raw material available between the areas containing the parts to be cut. The optimization method preferably provides relevant information concerning the result of simulation processes, including raw material and/or economic value yield data. The optimization method according to the invention may be implemented either as part of production equipment such as used in rough-mills or as a stand-alone computer system capable of performing simulation processes to provide further flexibility of use.

According to the former implementation, several of the optimization parameters can be predetermined, therefore requiring minimal data input and control tasks by an operator. The optimization method of the invention may be readily embodied in the form of a program code as computer software adapted to run on known computer hardware readily available in the marketplace, such as a personal computer provided with Pentium II 500 MHz or equivalent, with 128 Mbytes of RAM using Windows NT™ 4.0 operating software.

Turning now to FIG. 1a, the optimization method according to the invention is capable of determining a layout of selected parts to be cut from a piece of raw material with respect to first and second orthogonal reference axis, from data representing geometric and defect-related characteristic of the piece as represented by data block 30 as well as from data representing geometric and grade characteristic of a set of parts to be cut represented by data block 32.

Figure 3:
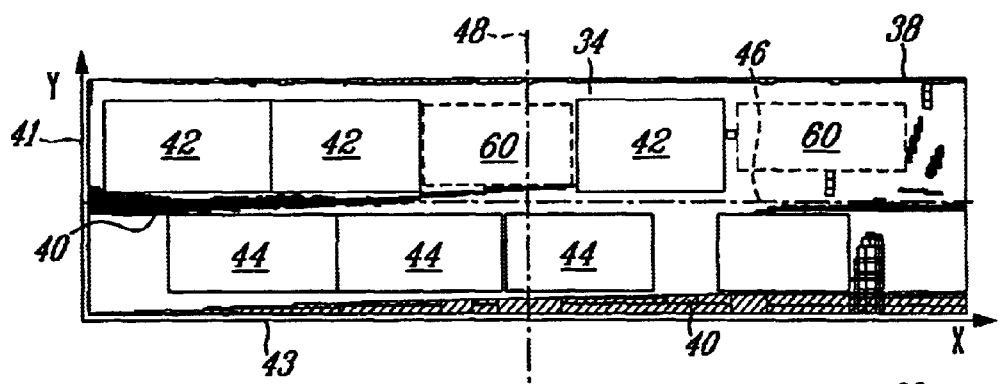
FIG. 3 is a schematic representation of a cutting layout for a given piece of lumber that has been processed according to an optimization mode adapted to rip-first cutting process, showing the two opposed main faces of the piece of lumber.

A shown in FIG. 3, the respective outlines of first and second opposed main surfaces 34, 36 of a piece of lumber 38 are set at respective positions near or at the origin of a reference coordinates system formed by first and second axis Y and X represented at 41 and 43. By definition, the dimensions of a given piece of lumber 38 correspond to the smallest dimensions that cover all of the parts forming the piece of lumber, including defect areas. It can also be seen from FIG. 3 that each of faces 34, 36 of piece of lumber 38 is characterized by the presence of several defects 40, the type of which is represented by various graphical textures according to a predetermined graphical code that will be explained later in more detail.

Turning back to FIG. 1a, the optimization method is initiated by a current optimization mode setting at an initial step 62. While the method can be implemented considering a single optimization mode such as basic rip-first or crosscut-first mode, the computer software is preferably programmed to allow the selection of a desired optimization mode among a plurality of optimization modes, including rip-first, crosscut-first, single-length/all-width crosscut-first (panel cutting), all-length/single-width rip-first, as well as any combination of these basic optimization modes such as hybrid and comparative yield optimization modes. As shown in the example of FIG. 3, the rip-first optimization mode considers first dimension values defined with respect to a first axis Y at 41, according to which respective width of series of aligned parts 42 and 44 are defined. For example, parts 42, 44 can be flooring wood products that are characterized as having a common, standard width (ex. 3 inch) without being associated with specific length requirements from the cutting bill, so that the computer software may determine a particular value for each wooden member 42, 44 in order to maximize either raw material or economic value yield. It can be appreciated from FIGS. 3 and 5a, according to a typical rip-first optimization mode, that the elongate piece of lumber 38 shown has its longitudinal axis 46 in parallel to the second reference axis X, while the same piece of lumber 38 has its transverse axis 48 parallel to first reference axis Y.

Figure 4:
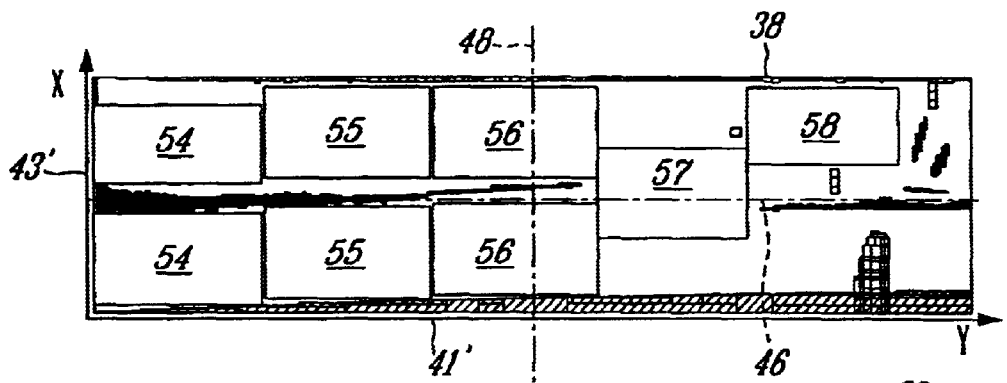
FIG. 4 is a schematic representation of the same piece of lumber shown in FIG. 3 to which the method of the present invention according to an optimization mode adapted to crosscut-first process has been applied.

In an analog manner, for a typical crosscut-first process, it can be seen from FIG. 4 that each panel included in a given subsection containing series of panels 54, 55, 56, 57 and 58 has a predetermined standard length, while the width dimension of each panel does not correspond to any requirement from the cutting bill, the width value for each panel being determined according with highest yield criteria as will be later explained with more detail. In the crosscut-first example of FIG. 4, it can be seen that the elongated piece of lumber 38 has now its longitudinal axis 46 parallel to a first reference axis Y at 41', while having its transverse axis. 48 parallel to a second reference axis X at 43'. The rip-first cutting process is further characterized in that the primary cuts represented by cutting axis 50 in FIG. 5a extend parallel to the longitudinal axis 46 of the piece of lumber 38. As will be later explained in more detail, the secondary cutting operation in a direction parallel to transverse axis 48 of the elongated piece of lumber 38 shown in FIG. 3 is performed sequentially to the primary cut operation along axis 50 shown in FIG. 5a in order to produce series of selected parts 42, 44 illustrated in FIG. 3. The crosscut-first mode of optimization involves a cutting process approach according to which the first dimension values considered in priority are defined with respect to a first axis Y as shown at 41' in FIG. 4, wherein the elongated piece of lumber 38 has its longitudinal axis 46 parallel to first reference axis Y at 41', while having its transverse axis 48 parallel to second reference axis X at 43'. The crosscut-first cutting process is further characterized in that the primary cuts represented by reference axis 52 in FIG. 5b are performed first in a direction parallel to transverse axis 48 defined by piece of lumber 38, followed by secondary cutting operations in a direction parallel to longitudinal axis 46 defined by piece of lumber 38 shown in FIG. 4 to produce series of parts 54, 55, 56, 57 and 58 as will be explained later in more detail. FIGS. 3 and 4 illustrate general cases involving all-length, all-width rip-first and crosscut-first optimization modes, respectively. The panel cutting optimization mode is a species of crosscut-first mode explained above, in which the parts to be selected are characterized by having a single, common length while having various widths, so that the primary cutting operation is to be performed over the whole width of a given piece of lumber. The all-length/single-width cutting process is a particular case of the basic rip-first process explained above, in which the selected product are characterized as having a single, common width while having various lengths, and the primary cutting operation is to be performed over the whole length of a given piece of lumber. Hybrid modes of optimization involve more than one basic mode of optimization to determine the arrangement of parts maximizing the yield value associated with the optimized layout to be produced. For example, such hybrid optimization mode may generate an optimized layout consisting of an arrangement of parts such as panels 42, 44 as well as components 60 having different dimensions as shown in dotted lines in FIG. 3. As opposed to panels 42, 44 shown in FIG. 3 and flooring wood members 54, 55, 56, 57 and 58 shown in FIG. 4, each component 60 shown in FIG. 3 has dimensions in the directions parallel to axis Y and X corresponding to a requirement of the cutting bill according to which the optimized layout is to be generated. Preferably, for hybrid optimization modes, an optimization time limit for processing each piece will be established and shared between all optimization modes involved.

Turning back to FIG. 1a, the current optimization mode setting step 62 conveniently initializes an optimization process by defining a reference coordinate system adapted to the selected optimization mode on the basis of a reference axis assignment principle according to which axis Y and X are arbitrarily chosen to be first and second orthogonal reference axis to perform rip-first optimization as applied in the example of FIG. 3, while same axis X and Y are chosen as first and second orthogonal reference axis for the purpose of crosscut-first optimization as applied in the example of FIG. 4. Such permutation of reference axis allows the use of essentially the same algorithm to perform optimization processes of the invention according to two or more optimization modes.

Turning again, to FIG. 1a, the method further comprises a step 63 of defining a subset of the set of parts listed in the cutting bill, characterized by a predetermined grade value i and associated with a predetermined group of first dimension values defined with respect to the first axis, namely with values defined with respect to axis Y in the case of a rip-first optimization process, as illustrated in FIG. 3. In the application of the method of the invention for pieces of lumber, the value assigned to grade i specifies a predetermined level of wood quality, each grade i being associated with one or more criteria related to characteristics of the raw wood material that will be used to produce a given product to which that specific grade i has been assigned. Preferably, for a number n of predetermined grade values that can be assigned to each product to be cut, an increasing cutting priority order i=1,n is considered to allow systematic generation of the arrangement of parts offering the best raw material or economic value yield. According to the invention, the optimal cutting layout solution is sought on the basis of subsets that are defined from a set of parts to be cut as established by the cutting bill defining the optimization mode and grade currently processed. In the example shown on the display screen of FIG. 6, the table 64 shown presents the criteria characterizing. six (6) distinct grades of decreasing quality listed in optimization priority order, namely clear, clear single-face, superior, dark, thin and reclaimed, each of which grades being associated with a distinct combination of defect features related to the presence or absence of knot, wane, coloration and missing wood. The given priority order assigned to each grade determines the placement sequence of corresponding parts. For example, while the presence of any of the above-mentioned defects on the raw wood material section would not be usable for a product to which a clear grade has been assigned, a raw wood material section characterized by only coloration without the presence of other kind of defects will always satisfy the requirements of either dark, thin or reclaimed grades, and may satisfy the requirements of either clear single-face or superior grades provided the coloration feature is found on a single face of the considered section of raw wood material. In order to allow accurate primary and secondary cutting operations while having the option of selecting parts of higher grade, the algorithm used by the computer software to perform the optimization method of the invention preferably considers both faces of a processed piece of lumber in the determination of whether a single-face defect should be considered as acceptable or unacceptable depending upon the specific grade considered, as will be explained later in more detail with reference to FIGS. 7 and 8. It can be seen from table 64 of FIG. 6 that to each grade can be associated a specific colour/shade code that could be conveniently used to facilitate the identification of parts listed in the given cutting bill that are assigned to a same grade, as will be explained later in more detail with respect to FIG. 14.

Turning now to FIG. 9 showing a main display screen generated by the computer software, relevant data representing geometric and defect-related characteristics of a given piece of lumber such as board no. 6 in the instant example is presented graphically. The main display screen of FIG. 9 provides various types of information, namely identification number assigned to the board for which data is displayed; board dimension data including length, width and surface area; initial and final clear-out positions relative to the origin of the reference coordinate system used, which values are chosen to ensure that the clear-out end portion of the board mainly includes unusable raw wood material; and number of identified defects found on either main faces of the current board. Furthermore, the main display screen preferably includes a table shown at 59 giving data specific to each listed defect, such as assigned identification defect number; position coordinates of each defect expressed as a pair of coordinates $(X_{min}, Y_{min}), (X_{max}, Y_{max})$ which represent the smallest rectangular area that completely contain the defect; identification of the face on which the defect appears; and type identification of the defect, namely knot, wane, coloration or missing wood as indicated in a legend generally designated at 66 on FIG. 9. The computer software implementing the method is configured so as the main display screen of FIG. 9 further includes a schematic plan view of both first and second faces 34, 36 of the current board into which the listed defects are represented by corresponding rectangular areas using the appropriate graphical code given by a legend 66. In the example shown, a small knot 68, larger knot 70 as well as coloration areas 72, 74 are associated with first face 34, while knot 76 and coloration areas 78, 80 are associated with second face 36. Finally, at the bottom portion of the display screen of FIG. 9, appropriate scales for axis Y and X used to represent first and second board faces 34, 36 are given. Conveniently, data regarding the definition of all assignable types of defects is contained in a configuration file to which the computer software has access. The types of defects that could be considered can be defined by anyone skilled in the art according to the specific application involved. In the context of lumber optimization application, typical defects include: edge-related defects associated with missing wood at an edge portion of a piece of lumber generally due to edge deformation or natural bending of the piece; wane characterized by missing wood generally located at edges of a piece of lumber mainly due to the generally circular cross-section of timber or to over-cutting operation at the planner stage; missing wood at the surface of a piece of lumber generally due to over-cutting either at debarking, pre-cutting or planning stages; and unacceptable dark knot and coloration areas that are unusable for specific application such as furniture manufacturing.

Figure 10:
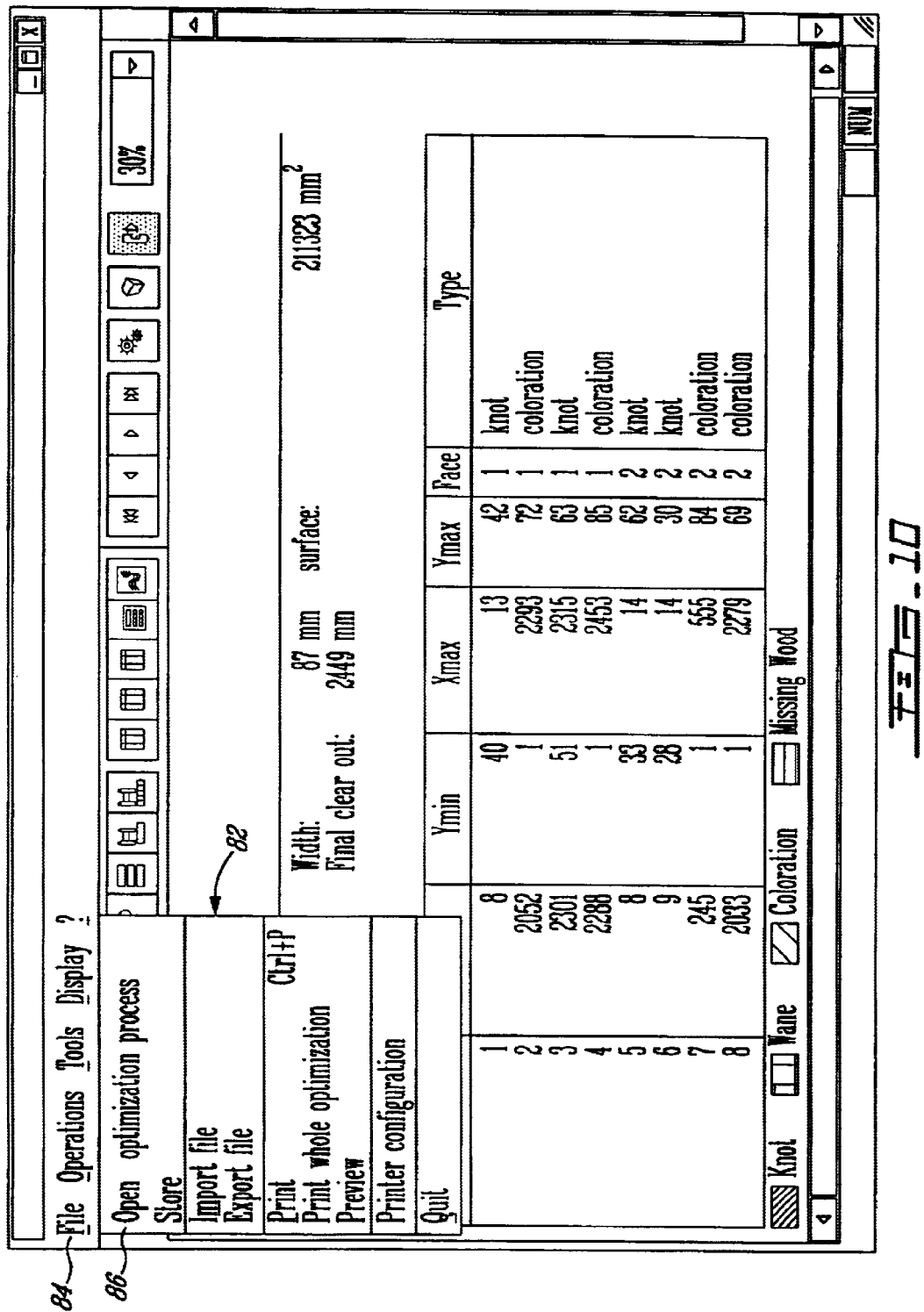
FIG. 10 represents a graphical display screen as generated by computer software, showing a sub-menu appearing upon activation of a "File" tab.

Turning now to FIG. 10, the pull-down sub-menu 82 upon activation of the "File" tab 84 gives access for the operator to an "Open optimization process" function as indicated at 86 that allows to open a simulation data file that has been previously stored in memory, the activation of which function will clear any currently downloaded data to substitute therefor data related to the selected simulation file. Preferably, each simulation data file refers to a number of subordinate data files having a different identification extension, such as lists of raw material pieces data file, cutting bill data file, grade definition data file, simulation result data file and replacement parts data file, the latter type of data being used to replace a part having been selected in a layout, by a new required part listed in a current cutting bill. A typical simulation data file includes data related to cutting bills, a list a raw material such as pieces of lumber, all simulation parameters as well as information regarding selected grades. Table 1 gives a list of typical simulation parameters with exemplary values contained in a simulation data file.

TABLE 1

| SIMULATION PARAMETER | VALUE |
|---|---|
| Name of simulation | Simultation-1 |
| Simulation start index (pieces data file) | 1 |
| Simulation end index (pieces data file) | 5 |
| Simulation mode | Rip-first |
| Secondary simulation mode | none |
| Tertiary simulation mode | None |
| Minimum yield reference value (%) | 50 |
| Units system | Metric (mm) |
| Piece thickness | 20 |
| Optimization time limit(s) | 600 |
| Weighing type | Reclaimed and factor |
| Weighing | Yes |
| Weighing factor - panel | 0.75 |
| Weighing factor - flooring wood | 0.75 |
| Minimum width - panel | 13 |
| Maximum width - panel | 175 |
| Minimum length - flooring wood | 254 |
| Maximum length - flooring wood | 2134 |
| Reclaiming function | Yes |
| Minimum reclaimed length | 483 |
| Maximum reclaimed length | 1397 |
| Minimum reclaimed width | 12 |
| Maximum reclaimed width | 482 |
| Ripping system length | 508 |
| Crosscutting system length | 3048 |
| All-length values | Yes |
| All-width values | Yes |
| Maximum remaining length | 25 |
| Saw kerf on edges | Yes |
| Ripping saw kerf width | 4 |
| Crosscutting saw kerf width | 4 |
| Replacement rule | Rule 1 |
| All-priority allowed | Yes |
| Replacement length threshold | 51 |
| Grade optimization | Yes |

Conveniently, if the current downloaded simulation file is afterward modified, the computer software will cause the display of a store confirmation dialog box to allow the operator to store updated data before leaving the session. Convenient functions such as "Store", "Import file", "Export file", "Print file", "Print whole optimization", "Preview", "Printer configuration" and "Quit" accessible through sub-menu 82 are preferably provided, such basic functions being readily implemented into a computer software through conventional programming. In particular, the "Print" may be used to print a currently displayed screen showing data regarding a current piece of lumber, while the "print whole optimization" function may be used to print all optimization layouts downloaded in memory associated with all pieces of lumber considered by the optimization process.

Referring now to FIG. 11, there is represented a graphical display screen generated by the computer software, presenting position information related to a plurality of ripping saws that may be used to perform either the primary cutting operation in the context of a selected rip-first optimization mode, or a secondary cutting operation when a crosscut-first optimization mode has been defined. Sawing system characteristics such as length and number of saws are shown, as well as a table 105 giving information related to each saw, namely saw identification number, position of saw (origin), width of cut, saw kerf width and indication whether each saw is mobile or fixed. A graphical representation of the position of each saw is presented within a frame 107.

Figure 12:
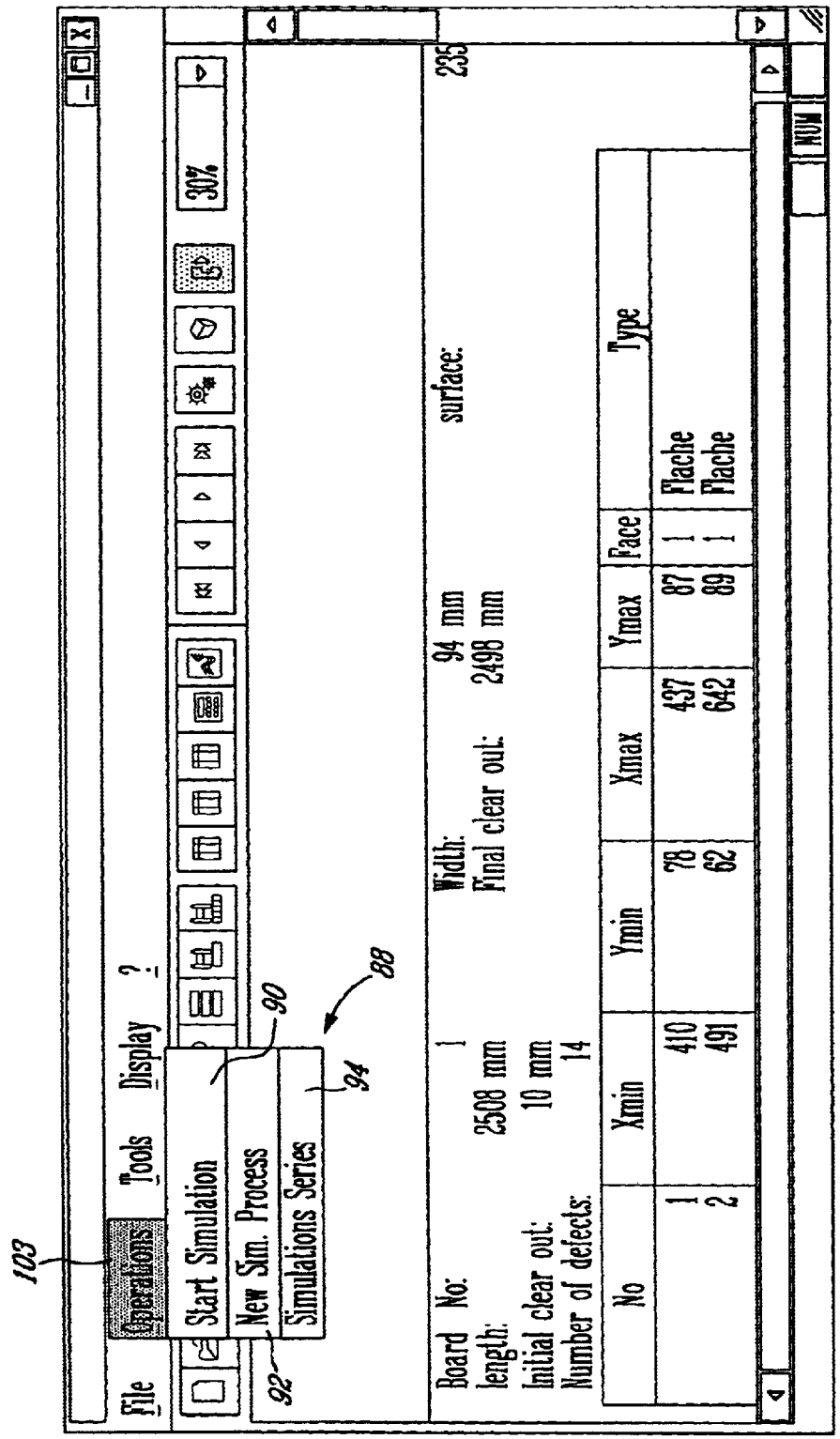
FIG. 12 represents a graphical display screen generated by computer software, showing a sub-menu appearing upon activation of an "Operations" tab.

Referring now to FIG. 12, a further pull-down sub-menu 88 generated upon activation of an "Operations" tab 103 is shown, which sub-menu 88 gives access for the operator to a group of further functions including a first "Start simulation" function at 90 allowing the operator to start a simulation process using the currently downloaded data contained in the selected simulation data file. A "New simulation process" function designated at 92 allows to clear the data regarding the current simulation process as well as the simulated part data defined by the current cutting bill to display a new blank screen, allowing the operator to initialize a new simulation process. The "Simulation series" function designated at 94 allows the operator to cause the computer software to perform without interruption a predetermined series of simulation processes between which specific parameters values are downloaded according to a pre-programmed control "batch" file, referring to sub-files such as simulation data files, simulation result data files, and production data file when the cutting bill is associated to a specific plant production. Each listed file is downloaded before the execution of each simulation process, and a corresponding series of simulation result files are generated and stored in memory.

Figure 13:
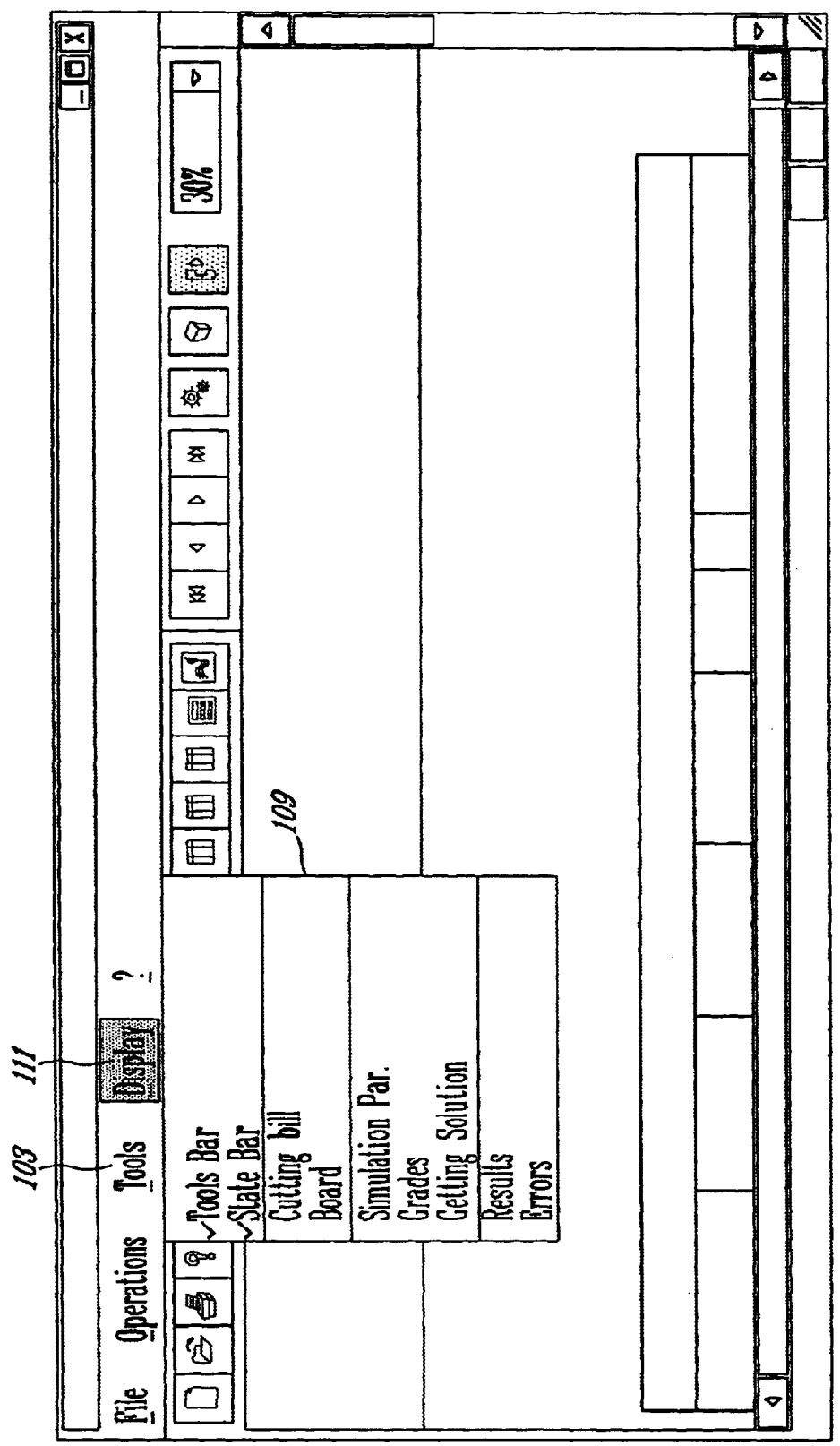
FIG. 13 represents a graphical display screen generated by computer software, showing a sub-menu appearing upon activation of a "Display" tab.

Turning to FIG. 13, a further pull-down sub-menu 109 generated upon activation of a "Display" tab 111 is shown, which sub-menu 109 gives direct access to functions such as tool bar and state bar setting functions, main board screen as shown in FIG. 9, as well as to other displayed screens that will be described later in detail, namely, simulation parameter, grades, cutting solution, results and error screens. Conveniently a "Tools" tab at 113 may be provided to give access to any optional data analysis functions that could be implemented into the computer software if needed.

Referring to FIG. 14, the cutting bill display screen gives the number of length values involved by the current set of parts to be cut whose characteristics are presented in the form of a table 115, containing the following data for each listed part: length value, width value, product type, requested quantity, remaining quantity (units), remaining quantity in %, grade, production identification number, part code, replacement priority indicator, weighing factor value, price (for economic value-based yield), active set of products indicator and infinite quantity indicator, the latter parameter being used whenever a limit requested quantity is not assigned to a particular part to be produced. Conveniently, the data related to each part of a currently active set of parts is presented in dark characters, while data related to remaining, replacement parts is presented in grey shade. The part replacement function and associated rules will be explained later in more detail. The computer software preferably provides other functions, such as to allow part addition into a current cutting bill, to allow parameter editing on several parts simultaneously, to add grades for the parts, to sort data in the various display screens or to print data reports.

Turning back to FIG. 1a, a group of first dimension values as set at step 63 allows the determination of simulation parameters characterizing each simulation trial as will be now explained on the basis of the following example, wherein a wooden board having a width of 150 mm is subjected to a rip-first optimization process considering a subset of three (3) distinct width values, namely 100 mm, 50 mm and 25 mm. For each trial, a numerical vector is generated as represented in Table 2, wherein to each column is associated a specific index designating one of the first dimension values of the group established from the subset of parts from which an arrangement is defined at each trial.

TABLE 2

| Index1 | Index2 | Index3 | Index4 | Index5 | Index6 |
|--------|--------|--------|--------|--------|--------|
| 1 | 2 | −1 | −1 | −1 | −1 |
| 1 | 3 | 3 | −1 | −1 | −1 |
| 2 | 1 | −1 | −1 | −1 | −1 |
| 2 | 2 | 2 | −1 | −1 | −1 |
| 2 | 2 | 3 | 3 | −1 | −1 |
| 2 | 3 | 3 | 3 | 3 | −1 |
| 3 | 1 | 3 | −1 | −1 | −1 |
| 3 | 2 | 2 | 3 | −1 | −1 |
| 3 | 2 | 3 | 3 | 3 | −1 |
| 3 | 3 | 3 | 3 | 3 | 3 |

The dimension of vector is determined according to the following relation:

$$VectorDim = \frac{PieceWidth}{(SmallWidth + KirfWidth)} \quad (1)$$

wherein:

PieceWidth is the width dimension of the piece;

SmallWidth is the smaller width dimension of the group of first dimensions; and

KerfWidth is the width of the kerf produced by the ripping saw to be used.

The VectorDim represents the maximal number of piece subdivisions that can be obtained for the optimization trial solution, through a primary rip-first cutting operation with respect to second reference axis X represented on FIGS. 3 and 5*a*, considering the selected optimization mode and grade. In the example given in Table 2, VectorDim is equal to six (6), i.e. Index1 to Index6, and ten (10) different optimization trial solutions have been generated according to a matrix filling algorithm that will be now explained. At the beginning of each iteration step, all matrix elements of the current matrix are filled with an initial value that has been arbitrarily chosen as "−1" to indicate that no corresponding number of subdivisions, characterized by the width dimension associated with the corresponding index, has been initially assigned to the index parameter. The index values are obtained through the first iteration step according to the following operation sequence:

```
CurrentWidth=Piece Width
FROM i=0 to i=NumWidth
{
    Width=GetWidth(i)+KerfWidth
    IF Width<Current Width
    {
        Repeat=Current Width/Width
        MatrixIndex=0
        FOR each Repeat
        {
            CurrentWidth=CurrentWidth−Width
            Matrix[MatrixIndex]=I
            MatrixIndex=MatrixIndex+1
        }
    }
}
``` wherein:

CurrentWidth is a parameter representing the current value of the remaining piece width;

NumWidth is a parameter representing the number of width dimensions contained in the group of first dimension values;

Width is a parameter representing the effective width dimension value corresponding to a current index of the matrix;

GetWidth(i) is a parameter representing the width value corresponding to width dimension of index i;

Repeat represents the number of subdivisions associated with a current index of the matrix; and MatrixIndex is a parameter designating a current index.

Subsequent matrix line filling steps are performed by finding a last index that can be decomposed, and by substituting for such last index a following index value corresponding to the next smaller width dimension that will be used to fill the remaining available piece surface. It can be appreciated that index values i=1,6 shown in the example of Table 2, are associated with width dimensions of decreasing values. Such last index finding step can be performed according to the following position finding sequence:

```
DecompIndex=0
FROM i=0 to i=VectorDim
{
    IF Matrix[I]<SmallWidthIndex
    {
        DecompIndex=I
    }
}
``` wherein:

DecompIndex is a parameter designating an index value corresponding to the current position to be decomposed; and SmallWidthIndex is a parameter. designating an index value corresponding to the smallest width of the group.

Then, the matrix must be further modified in order to decompose the position found, by first recalculating the remaining available width until the position just preceding the matrix position to be decomposed is reached.

Then, the selected position is decomposed while the remaining cells of the matrix are filled by calculating width of used material, according to the following sequence:

```
CurrentWidth=PieceWidth
FROM i=0 to i=(DecompIndex-1)
{
    CurrentWidth=CurrentWidth−GetWidth(Matrix[1])
}
Index=Matrix[DecompIndex
Index=Index+1
Matrix[DecompIndex]=Index
CurrentWidth=CurrentWidth−GetWidth(Matrix[DecompIndex])
FROM j=0 to j=NumWidth
{
    Width=GetWidth(j)+KerfWidth
    IF Width<CurrentWidth
    {
        Repeat=CurrentWidth/Width
        MatrixIndex=DecompIndex+1
        FOR each Repeat
        {
            CurrentWidth=Current Width−Width
            Matrix[MatrixIndex]=I
            MatrixIndex=MatrixIndex+1
        }
    }
}
FROM k=0 to k=MatrixDimension
{
    Index=Matrix[k]
```

```
        IF Index<>SmallWidthIndex
        {
            FilledMatrix= FALSE
        }
    }
    FilledMatrix= TRUE
``` wherein:
   Index is an incremental parameter;
   MatrixDimension designates the specific dimension of the matrix which is equal to the resulting value of nxn; and
   FilledMatrix is a flag indicating whether matrix filling is completed or not.

The number of different lines forming a current matrix defining the optimization trial solutions to be generated is dictated by the PieceWidth value characterizing the currently processed piece, the cutting layout of which has to be optimized, as well as by the number of width dimensions forming the group characterizing the subset of parts serving as a basis for the optimization trial. The optimization process is completed when all trials have been performed so that all cells of the last trial correspond to the index value of the smallest width as shown in Table 2. It is to be understood that the foregoing algorithm for building the trial matrix as applied to the rip-first optimization mode can be readily adapted to other types of optimization modes such as crosscut-first or hybrid optimization modes by providing appropriate reference axis system permutation as explained before regarding the optimization mode setting step 62 shown in the flow diagram of FIG. 1*a*. For example, for an application involving crosscut-first optimization mode, the length dimension of the pieces would be substituted for the width dimension referred to in the foregoing example involving rip-first optimization mode, while the subdivisions of each piece would be established from a group of length values as first dimension values defined with respect to axis Y considered as the first axis as shown in FIGS. 4 and 5*b*. It is pointed out that the foregoing algorithm allows to generate data defining an arrangement of subdivided piece surface sections to be obtained through a primary cut operation, corresponding to step 65 in FIG. 1*a*, which piece surface sections are designated at numeral 67 and 69 in FIGS. 5*a* and 5*b* respectively associated with rip-first and crosscut-first optimization modes as described above. It is also pointed out that at this stage of the method, none of the optimization trial solutions includes any subdivided piece surface section having width/length dimensions characterizing parts to which are assigned any grade that is different from the selected grade for the current optimization process. At a later stage of the optimization process, the best optimization trial solution will consider other grades of lower quality according to a recycling approach that will be later explained in detail. The data generating step 65 is performed from the matrix as filled with width indicative index values taken from the group of width values considered as first dimension values, wherein to each width value corresponds a number of parts characterized by that common width value as defined in the current cutting bill.

Turning back to FIG. 1*a*, following step 65 is a further step 71 of generating data finding one or more subsections included in each piece surface section generated at preceding step 65, according to the geometric and defect-related characteristics of the piece of lumber under processing. Each of the optimization trial generates a number of piece surface sections to be obtained through a primary cutting operation, each of which piece surface sections being afterwards subdivided independently to produce a basic cutting optimization solution as will be later explained in more detail. Such basic cutting of the piece surface sections on the basis of the data generated at step 71 preferably considers a two-face lateral exploration of each piece of lumber, wherein all defect identified is sorted so as to obtain a defect list in terms of coordinates $X_{min}$ and $Y_{max}$.

Turning now to FIG. 7, a typical piece of lumber section is schematically represented by top view of first face 73 and bottom view of second face 73'. It can be seen that respective positions of secondary cutting lines 75, 77 and 79 are determined so that each of the three (3) subsections generated by these secondary cutting lines, as designated at 81, 83, 85 on first face 73 and at 81', 83', 85' on second face 73', is either free of any defect or contains one or more acceptable defects depending on the current grade, as explained above with reference to FIG. 6. Furthermore, each subsection has a length larger than the minimum length characterizing the parts contained in the considered subset and has a width value that is equal to the width of the whole section whose faces 73, 73' are represented on FIG. 7. The data-generating step 71, along with series of steps 87, 89, 91, 93 and 95 which are necessary to optimize the current subsection according to the set optimization mode as explained later in more detail, can be implemented into the computer software according to the following algorithm:

```
NumDefect=GetNumDefect(Piece)
XMax=XSectionMax
XMin=XSectionMinSelectFace=1
FROM i=0 to i=NumDefect
{
    CurrentDefect=GetDefect(i)
    IF CurrentDefect intersects the current piece section
    {
        DefectCategory=GetDefectCategory(CurrentDefect,SelectGrade,
                SelectFace)
        IF DefectCategory<>Acceptable
        {
            AvailLength=XMinIntersection-Xmin
            IF AvailLengh>MinLength
            {
                Generate the Subsection
                Optimize the Subsection according to set optimization mode
            }
            IF SingleFaceDefec==TRUE
            {
                XMin=XMinDefect
                IF SelectFace==1
                {
                    SelectFace=2
                }
            }
            IF NOT
                XMin=XMaxDefect
        }
    }
}
AvailableLength=XMax-XMin
IF AvailableLength>MinLength
{
    Generate the Subsection
    Optimize the Subsection according to set optimization mode
}
``` wherein:
   NumDefect represents the number of defects identified for a currently processed piece of lumber;
   XMax designates the maximum coordinate value along second axis X in relation with a currently processed subsection;

XSectionMax designates the maximum coordinate value along second axis X in respect of a currently processed section;

XMin designates the minimum coordinate value along second axis X in relation with a currently processed subsection;

XSectionMin designates the minimum coordinate value along second axis X in respect of a currently processed section;

SelectFace designates a selected one of first and second faces of the piece of lumber;

CurrentDefect designates the defect currently processed;

GetDefect(i) designates defect-characterizing data associated with a defect i;

DefectCategory designates a currently processed defect category;

GetDefectCategory designates category-characterizing data according to the current defect, selected grade and selected face;

SelectGrade designates the selected grade under processing;

AvailableLength designates available length value of the currently processed subsection;

XMinIntersection designates the coordinate value along second axis X where the current defect intersects the currently processed section;

MinLength designates the minimum length value characterizing the subset of parts considered;

SingleFaceDefect is a logical parameter indicating whether a single-face defect elimination is required;

XMinDefect designates the minimum coordinate value along second axis X related to current defect under processing; and XMaxDefect designates a maximum coordinate value along second axis X in respect of a current defect under processing.

Turning again to FIG. 1a, data generating step 87 by which, for each subsection, a plurality of arrangements of parts selected from the subset of parts to be obtained through the secondary cutting operation, will be now explained in greater detail. The ultimate purpose of data generating step 87 is to fill a defect-free subsection as generated at prior step 71, by placing therein the arrangement of parts selected from the previously established subset of parts that will maximize surface utilization of the currently processed section. For so doing, a plurality of distinct arrangement of parts must be considered and qualified, using a matrix-based approach that is similar to the one applied for generating optimization trials obtained at step 65. A trial matrix is generated through position permutation of selected parts. It is pointed out that as opposed to the trial generation algorithm explained above in respect of step 65, placement order within a same subsection does not have any effect on the resulting raw material yield. Preferably, each arrangement of parts is generated so as to maintain at least one product of each width value that has been already selected, to preserve parts having the largest width that have been selected first. For example, with a subsection of 100 mm width and 400 mm length, let's assume that the following subset of parts has been established according to table 3:

TABLE 3

| Part Number | Width mm | Length mm |
|---|---|---|
| 1 | 120 | 350 |
| 2 | 100 | 200 |
| 3 | 90 | 150 |
| 4 | 75 | 150 |
| 5 | 50 | 100 |

Each line of the secondary optimization trial matrix shown in Table 4 can be filled with appropriate index values, wherein only two lines are generated in the instant example considering the above-mentioned condition according to which decomposition is carried out while ensuring that at least one product of each width that has been already selected is included within the arrangement.

TABLE 4

| Index1 | Index2 | Index3 | Index4 |
|---|---|---|---|
| 2 | 2 | −1 | −1 |
| 2 | 3 | −1 | −1 |

The data generating step 87 may be performed using the following algorithm:

```
WHILE LastTrialCompleted=FALSE
{
    Surface=0
    LastTrialCompleted=FIND.DECOMPINDEX
    FILL.MATRIXSECONDCUT
    NumPart=GetNumPart(Subsection)
    FOR i=0 to i=NumPart
    {
        Part=GetPart(MatrixIndex[I])
        Surface=Surface+GetSurface(Part)
    }
}
``` wherein:

LastTrialCompleted is a flag indicating whether a last simulation trial has been completed or not;

Surface is a parameter whose value represents the surface area obtained from the current arrangement of parts associated with a currently processed subsection;

FIND.DECOMPINDEX designates a subroutine the purpose of which consists of finding the value of a currently decomposable index and returning a flag value as an indication of the end of the decomposition process;

FILL.MATRIXSECONDCUT designates a subroutine the purpose of which is to fill the optimization trial matrix associated with the currently processed subsection;

NumPart is a parameter whose value represents the number of parts contained in the arrangement associated with a current optimization trial;

GetNumPart(Subsection) designates a function according to which the number of parts included in a currently generated arrangement is assigned to the NumPart parameter;

Part is a parameter providing identification of a specific part contained in the arrangement of parts associated with a current optimization trial;

GetPart(MatrixIndex[i]) designates a function according to which a value for the part parameter is found corresponding to the currently processed MatrixIndex [1] value; and GetSurface(Part) designates a function according to which the surface value associated with a specific part is found for the purpose of surface calculation.

The FIND.DECOMPINDEX subroutine may be implemented according to the following algorithm:

```
IF Matrix[0]=-1
    Return FALSE
FROM i=0 to i=VectorDim
{
    Index=GetIndex(i)
    IF Index<>SmallWidthIndex
    {
        IF LastPiece=FALSE
        {
            DecompIndex=i
            Return FALSE
        }
    }
}
``` wherein:

GetIndex(i) designates a function according to which the index value corresponding to the current value for i is found and assigned to the index parameter.

It can be appreciated that according to the above algorithm, whenever the matrix value at first position "0" responds to a "0" value, it immediately follows that the current matrix has not been previously initialized, and the return flag value "FALSE" causes the algorithm to generate a first line within the current matrix. The algorithm will return a "TRUE " flag value whenever there is no further matrix position index to be decomposed and will return "false" flag value whenever there is one or more further decomposable index positions. Whenever the condition Matrix[0]=−1 is satisfied, the first matrix line can be generated as follows:

```
CurrentLength=SubsectionLength
Position=0
FROM i=PartStartIndex to i=PartEndIndex
{
    Part=GetPart(i)
    PartLength=GetLength(Part)+ KerfWidth
    PartWidth=GetWidth(Part)
    WHILE (PartLength<CurrentLength) AND
    (PartWidth<SubsectionWidth)
    {
        CurrentLength=CurrentLength-PartLength
        Matrix[Position]=i
        Position=Position+1
    }
}
``` wherein:

CurrentLength is a parameter representing the current value of the available subsection length;

SubsectionLength represents the total length value of the current subsection;

SubsectionWidth represents the total width value of the current subsection;

PartStartIndex represents a start index value associated with the subset of parts selected according to the current grade and optimization mode;

PartEndIndex represents an end index value associated with the subset of parts selected according to the current grade and optimization mode;

GetPart(i) represents a function according to which data corresponding to a part i selected from the subset of parts is found;

PartLength represents an estimated value for the resulting length of a part i considering the kerf width value;

PartWidth represents the width value associated with part i;

GetPartWidth represents a function according to which the current width value of part i is assigned to PartWidth parameter.

Once the first line of the subsection trial matrix has been generated, one or more further lines of index values can be generated as part of the FILL.MATRIXSECONDCUT subroutine according to the following algorithm:

```
CurrentLength=SubsectionLength
FROM i=0 to i=(DecompIndex-1)
{
    Part=GetPart(i)
    PartLength=GetLength(Part)+KerfWidth
    CurrentLength=CurrentLength-PartLength
}
Index=Matrix[DecompIndex]
Index=Index+1
SelectPart=FALSE
WHILE (SelectPart=FALSE AND Index<PartEndIndex)
{
    Part=GetPart(Index)
    PartLength=GetLength(Part)+KerfWidth
    IF Length<CurrentLength
    {
        SelectPart=TRUE
        CurrentLength=CurrentLength-PartLength
        Matrix[DecompIndex]=Index
    }
    IF NOT
    {
        Matrix[DecompIndex]=-1
    }
}
FROM j=DecompIndex to j=VectorLength
{
    Matrix[j]=-1
}
NextIndex=DecompIndex+1
FROM k=Index to k=PartEndIndex
{
    Part=GetPart(k)
    PartLength=GetLength(Part)+KerfLength
    PartWidth=GetWidth(Part)
    WHILE (PartLength<CurrentLength) AND (PartWidth<Subsection
    Width)
    {
        CurrentLength=CurrentLength-PartLength
        Matrix[NextIndex]=k
        NextIndex=NextIndex+1
    }
}
``` wherein:

SelectPart designates a flag parameter indicating whether a further part has been selected or not; and NextIndex is an incremental parameter used by the algorithm to complete matrix filling for the remaining index positions of further lines.

In the example of Table 4, the matrix shown includes two (2) lines of index values corresponding to two (2) optimization trial solutions for a current subsection. After having generated data defining for a current subsection, the plurality of arrangement of parts to be included therein and selected from the subset of parts, i.e. parts 1–5 in the above example, which parts will be produced through a secondary cutting operation with respect to a first reference axis Y shown in FIGS. 3 and 5a, the method according to the invention further includes a step 89 as shown in FIG. 1a according to which yield values associated with all arrangements of parts are estimated. It can be seen from Table 4 that the first trial solution involves the inclusion of two (2) parts of index "2" assigned to Index1 and Index2, resulting to 100% surface coverage of the current subsection (40 000 mm$^2$), while the second optimization trial solution for the same subsection involves the inclusion of one (1) part of index "2" along with one (1) part of index "3", assigned to Index1 and Index2 respectively, the latter arrangement of parts leaving a remaining surface area unused (500 mm$^2$). The method further proceeds with a step 91 of comparing the yield values to select the arrangement of parts having a highest yield value. In the example for which optimization results are presented in Table 4, the first optimization trial solution for the current subsection whose index values are given in the first line of the matrix is found to have the highest surface yield value compared with the yield value provided by the optimization trial solution whose index values are given at the second line of the matrix. Let's now consider another example of the proposed method involving a subset of parts whose characteristics are given in Table 5 with the resulting subsection optimization matrix shown in Table 6.

TABLE 5

| Part number | Width (mm) | Length (mm) |
|---|---|---|
| 1 | 120 | 350 |
| 2 | 100 | 200 |
| 3 | 100 | 120 |
| 4 | 90 | 170 |
| 5 | 50 | 100 |

TABLE 6

| Index1 | Index2 | Index3 | Index4 |
|---|---|---|---|
| 2 | 2 | −1 | −1 |
| 2 | 3 | 3 | −1 |
| 2 | 3 | 4 | −1 |

It can be appreciated that the third optimization trial solution for the current subsection is found to be the best solution following comparison of its resulting surface yield (49 000 mm$^2$) with the resulting yield value obtained with the first trial solution (40 000 mm$^2$) and second trial solution (44 000 mm$^2$). Even if part no. 4 is characterized by a width value lower than the corresponding width value of part no. 3, the arrangement part lengths provided by the third trial solution allows complete filling of the available surface area of the current subsection. It is to be understood that although the maximizing surface criterion has been preferably applied in the above examples, an economic-based criterion or combined economic/surface yield criterion may be also applied using the same basic algorithms as described above. Although the above algorithms are adapted to rip-first optimization mode, these algorithms can be readily adapted to other optimization modes by any person skilled in the art of computer programming, using the axis permutation principle as set forth before, or any other equivalent approach. For example, the axis permutation may be obtained using to the following operation sequence:

Store=XMin
Xmin=YMin
YMin=Store
Store=YMax
YMax=Xmax
Xmax=Store
wherein Store is a transfer variable.

In the particular case of panel production, crosscut-first optimization mode, the following algorithm may be used to performed step 87 of FIG. 1a for a current subsection:

```
CurrentLength=SubsectionLength
PositionX=XminSubsection
AvailWidth=SubsectionWidth
FROM i=PartStartIndex to i=PartEndIndex
{
    Part=GetPart(i)
    Length=GetLength(Part)
    IF Length<CurrentLength
    {
        Repeat=AvailWidth/MaxBoardWidth+KirfWidth
        WHILE Repeat>0
        {
            Select a Panel having width=MaxBoardWidth
            AvailWidth=AvailWidth-MaxBoardWidth
        }
        IF AvailWidth>MinBoardWidth
        {
            Select a Panel having width=AvailWidth
            AvailWidth=0
        }
    }
}
``` wherein:

PositionX represents the coordinate value along first reference axis X shown in FIGS. 4 and 5b;

XMinSubsection designates the minimum coordinate along first reference axis X;

MaxBoardWidth designates the maximum width value that can be assigned to a selected panel;

MinBoardWidth designates the minimum width value that can be assigned to a selected panel; and AvailWidth designates a width value associated with available surface area of the current subsection.

Having selected the arrangement of parts providing a highest yield value, a basic yield value is estimated at a following step 93 represented on FIG. 1a, which basic yield value is associated with the arrangement of subdivided piece surface sections to each of which corresponds an arrangement of parts having a highest yield value. For so doing, all highest yield values corresponding to the arrangement of parts associated with all subsections for each piece surface section are cumulated. Then, whenever there. is a new arrangement of subdivided piece surface sections to be processed, steps 65, 71, 87, 89, 91 and 93 are repeated as indicated by connection A-2 in FIG. 1a, following an affirmative result coming from condition checking block 102 shown in FIG. 1a. Whenever there is no new arrangement of subdivided piece surface sections to process, all basic yield values so obtained are compared to one another in order to select the arrangement of subdivided piece surface sections associated with the arrangements of parts providing a maximal basic yield value to be included in the optimized layout of selected parts to be cut at a step 85 following a negative result from condition checking block 102.

Figure 1B:
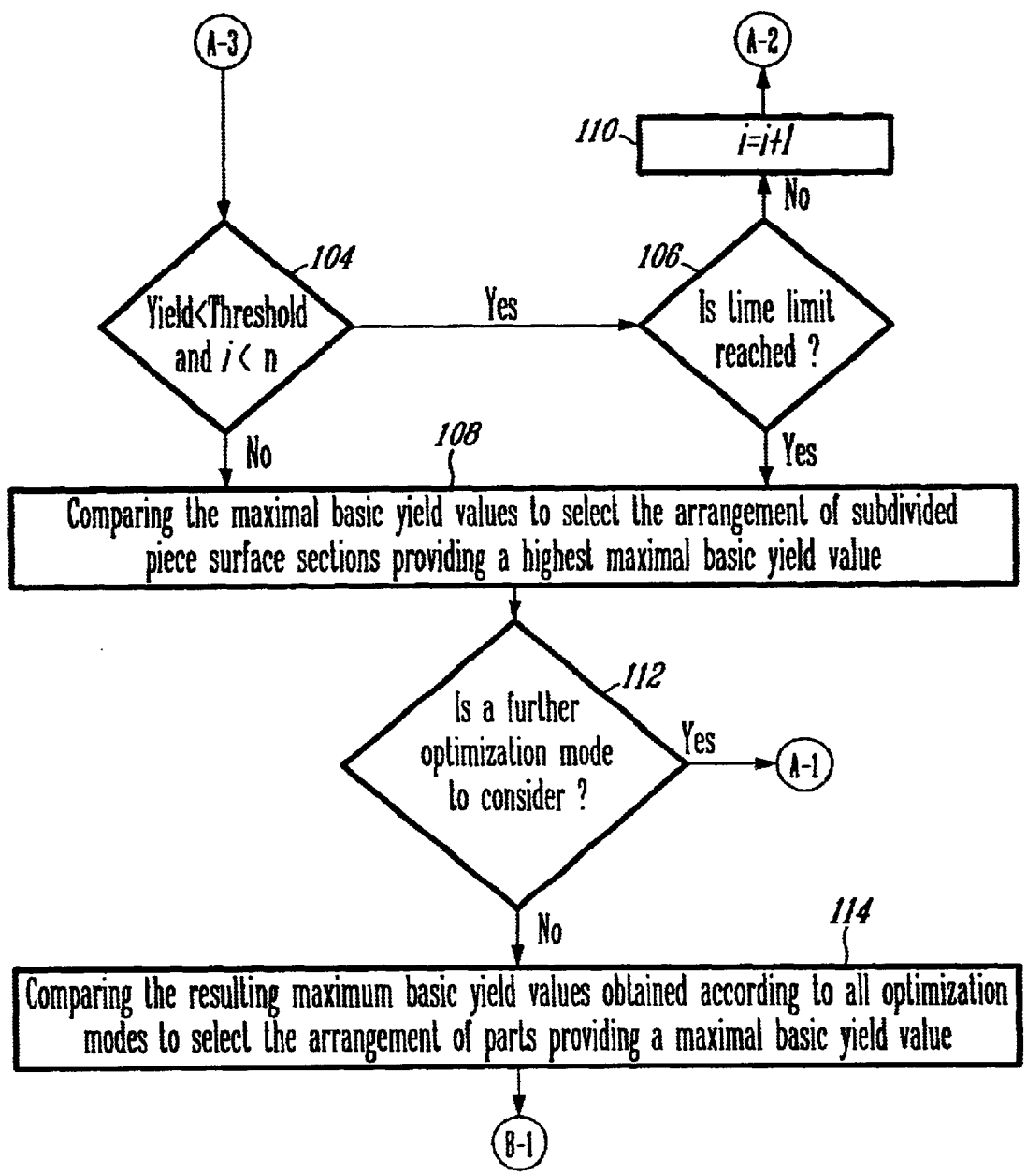
FIG. 1b is a process flow diagram complementary to the diagram of FIG. 1a, representing further method steps involving a group of n predetermined grade values of decreasing cutting priority order and a further optimization mode to be considered to select the arrangement of parts providing a maximum basic yield value.

Turning now to FIG. 1b, the optimization method according to the invention preferably includes a further series of steps providing improved optimization efficiency by the consideration of a minimum yield reference value or threshold associated with the selected grade value i, according to which the optimization routine explained before with reference to FIG. 1a is repeated considering at least one further optimization grade value of decreasing priority compared to the currently processed grade value. The minimum yield reference value may be selected according to the average yield expected from the grade mix of pieces of lumber and current optimization mode. Examples of expected average yields per standard NHLA grade of pieces of lumber and selected optimisation mode are given in Table 7.

TABLE 7

Expected yields per NHLA grade and otimisation mode (average %)

| Grade NHLA | Ripfirst | Crosscut | Flooring |
|---|---|---|---|
| 1C | 65 | 63 | 70 |
| 2C | 60 | 58 | 67 |
| 3C | 55 | 53 | 65 |

As shown in FIG. 1b, the further series of steps begins with a comparing step represented by condition checking block 104 according to which the maximal basic yield value is compared with a predetermined minimum yield reference value or threshold associated with the predetermined grade of value i, to preferably apply in the affirmative a further test represented by condition checking block 106 according to which the optimization process is allowed to continue as long as a predetermined processing time limit is not reached, in which case the optimization process is terminated and the obtained maximal basic yield values are compared in a manner that will be later explained in detail. In other words, the basic optimization process is allowed to operate within a predetermined processing time limit until the arrangement of subdivided piece surface sections providing a highest maximal basic yield is obtained at a following step 108. Whenever the time limit condition is not yet satisfied, the grade value i is incremented at step 110 prior to the repetition of step 63, to define a further subset from the set of parts characterized by the further predetermined grade value i=i+1 associated with further predetermined group of first dimension values defined with respect to the first axis Y as shown in FIG. 3 for rip-first optimization mode (group of width values) or axis X as shown in FIG. 4 for crosscut-first optimization mode (group of length values). Then, steps 65, 71, 87, 89, 91, 93, 102 and 95 are performed again to estimate a further maximal yield value associated with the further predetermined grade value i+1 and corresponding arrangement of subdivided piece surface sections, whenever the condition set forth at 104 is satisfied, as long as the time limit imposed at condition checking block 106 is not reached. Otherwise, the maximal basic yield values obtained are compared with one another at 108 to select the arrangement of subdivided piece surface sections providing a highest maximal basic yield value to be included in the optimized layout of selected parts to be cut. In other words, in a case where group of n predetermined grade values of decreasing cutting priority order with i=1,n, following a basic yield value obtained for a first predetermined grade value i=1, for each predetermined grade value i=2,n, the basic optimization sequence is repeated providing the condition set forth at 104 is satisfied within the time limit of condition 106. The choice of the minimum yield reference value has a significant effect on grade placement sequence. A low reference value will cause an optimization process to terminate while considering only the main selected grade, whereas a high reference value will cause the optimization process to consider other lower quality grades to increase the yield, thereby limiting placement of parts associated with the selected main grade.

Whenever the method considers more than one basic optimization mode, according an affirmative output generated at condition checking block 112, the optimization process is repeated from the initial step 62 whereby a new optimization mode is set as the current optimization mode as indicated by connection A-1. Then, the following steps 63, 65, 71, 87, 89, 91, 93, 102, and 95 shown in FIG. 1a as well as steps 104, 106 and 108 shown in FIG. 1b are repeated to obtain the corresponding arrangement of subdivided piece surface sections associated. with corresponding arrangement of parts providing a maximal basic yield value according to the selected optimization mode. Whenever there is no further optimization mode to consider, at a following step 114, the maximum yield values of step 108 obtained according to all optimization modes are compared with one another, to select the arrangement of parts providing a maximal basic yield value to be included in the optimized layout of selected parts to be cut.

The optimization method according to the present invention preferably performs a secondary part selection called "recycling" that will now be explained with reference to FIGS. 1c, 1d and 2. The primary part selection as explained before leaves unused surface areas within the sections as part of each piece of lumber being processed. These unused surface areas may be defect adjacent area, part adjacent areas, or free areas that cannot be used by parts of other categories which cannot be considered by the primary selection due to particular defects distribution. The secondary selection according to the invention consist of scanning free areas remaining to the surface of a given piece section in an attempt to select parts from all predetermined grades, beginning with grades of higher priority. Referring now to FIG. 1c, a first step 116 provides the setting of a current optimization mode, preferably among several optimization modes to each of which is assigned a relative priority indicator. At step 118, a further subset of the set of parts characterized by the current grade value i with i=1,n is defined. Such further subset building is required by the secondary selection function since the currently processed grade value is caused to vary. At a following step 120, there is provided data defining, for each arrangement of parts in each subsection included in each piece surface section providing a maximal basic yield value as explained before, one or more free areas according to the geometric and defect-related characteristics of the piece. The selected parts as part of the current optimization solution being grouped for each section processed, it is possible for the computer software to scan the list of parts for each corresponding section to provide efficient searching. In production, the additional parts can be obtained through secondary and tertiary cutting operations with respect to first and second reference axis Y, X, for rip-first optimization mode, and X, Y for crosscut-first optimization mode.

Referring now to FIG. 15, the surface surrounding a given selected part represented at 5 as been subdivided into nine areas which are grouped as follows: part pre-located areas (1, 2, 3), part located areas (4, 6) and part post-located areas (7, 8, 9) as part of a currently processed section 67. The general secondary part selection process can be implemented in the computer software using the following algorithm:

```
PartStartIndex=FindPartStartIndex(Order)
PartEndIndex=FindPartEndIndex(Order)
MinLength=FindMinLength(Order)
MinWidth=FindMinWidth(Order)
IF PartStartIndex<> -1
{
    Sort parts for the current Solution
    NumPart=GetNumPart(Solution)
    NumSection=GetNumSection(Solution)
    FROM i=0 to i=NumSection
    {
        Section=GetSection(i)
        PreceedPart=NULL
        FROM k=0 to k=NumPart
        {
            Part=GetPart(Solution,k)
            IF GetSection(Part)==Section
            {
                IF PreceedPart=NULL
                {
                    FreeArea=PrePartArea
                    Optimize FreeArea
                }
                IF NOT
                {
                    FreeArea=InterPartArea
                    Optimize FreeArea
                }
                IF Part is located near the lower edge of the section
                {
                    FreeArea=OverPartArea
                    Optimize FreeArea
                }
                IF NOT
                    FreeArea=UnderPartArea
                    Optimize FreeArea
                }
                PreceedPart=Part
            }
        }
        IF Part <>NULL
        {
            FreeArea=PostPartArea
            Optimize FreeArea
        }
        IF NOT
        {
            FreeArea=Section
            Optimize FreeArea
        }
    }
}
``` wherein:

FindPartStartIndex(Order) designates a function allowing to retrieve the value of PartStartIndex according to the current cutting bill;

FindPartEndIndex(Order) designates a function allowing to retrieve the value of PartEndIndex corresponding to the current cutting bill;

FindMinLength(Order) designates a function allowing to retrieve the value of MinLength according to the current cutting bill;

MinWidth represents the current minimum width value for a part;

FindMinWidth(Order) designates a function allowing to retrieve the minimum width value for the parts included in a current cutting bill;

NumPart represents the current number of parts;

GetNumPart(Solution) designates a function allowing to retrieve the number of part corresponding to a current processed solution;

NumSection represents the current number of sections;

GetNumSection(Solution) designates a function allowing to retrieve the number of sections involved in a currently processed solution;

Section designates a currently processed section;

PreceedPart is a parameter indicating whether there is a preceding part before a currently processed part and identifying such preceding part whenever it exists;

GetPart(Solution, k) designates a function allowing to retrieve the data relating to a part k as part of a solution under processing;

GetSection(Part) designates a function allowing to retrieve the data related to the section including a currently processed part;

FreeArea designates a currently processed free area of raw material available for placing parts therein;

PrePartArea designates a free area located before a part that has been incorporated in a current solution through the primary selection process.

InterPartArea designates a free area located between two parts incorporated into the currently processed solution through the primary selection process;

OverPartArea designates a free area located over the part incorporated into the solution through the primary selection process;

UnderPartArea designates a free area located under a part incorporated into the solution through the primary selection process; and PostPartArea designates a free area located after a part that has been incorporated into the currently process solution according to the primary selection process.

In order to optimize FreeArea referred to in the above algorithm, the computer software has to scan the corresponding free area while going through defects characterizing data related to the currently processed piece of lumber for checking those defects that intersect the considered free area in order to generate the larger defect-free area that can be defined within the free area, considering the current grade limitations. Hence, if the resulting defect-free area is found to be larger than the minimum dimensions (width, length) of the parts included in the subset of parts that has been established according to the current grade and optimization mode, additional parts may be selected to be included within such defect-free area. The Optimize Free-area subroutine may be programmed according to the following algorithm:

```
Piece=GetCurrentPiece
NumDefect=GetNumDefect(Piece)
FROM i=0 to NumDefect
{
    CurrentDefect=GetDefect(Piece, i)
    DefectCategory=GetDefectCategory(CurrentDefect, SelectGrade, SelectFace)
    IF DefectCategory=Unacceptable OR SingleFaceAcceptable
```

-continued

```
{
    Extract the largest defect-free area
}
IF the defect-free area does no intersect any existing selected parts
{
    Place additional selected parts within the defect-free area
}
}
``` wherein:

Piece designates a specific piece of lumber;

GetCurrentPiece designates a function allowing to retrieve identification data related to a currently processed piece of lumber;

GetDefect(Piece,i) designates a function allowing to retrieve data identifying a currently processed defect i;

Unacceptable is a parameter indicating that a given defect is considered as belonging to an unacceptable category of defect;

SingleFaceAcceptable is a parameter indicating that a given defect belongs to a category according to which a defect appearing on a single face of the lumber piece is acceptable;

The largest defect-free area is extracted in a manner that will be now explained with reference to FIG. 15. The approach used consists of identifying and isolating from the considered piece area, each unacceptable or single-face acceptable defects, for then determining dimensions and locations of rectangular defect-free areas that maximize placement areas. It can be seen in FIG. 15 that, surrounding a previously selected part 5, pre-part areas includes areas 1, 2 and 3, over-part area includes area 4, under-part includes area 6 and post-part areas includes areas 7, 8 and 9. It must be pointed out that inter-part area may also be identified whenever two or more selected parts are present on a given section of a piece of lumber. Each of the above-mentioned group of areas will be subjected to a surface area calculation to establish spatial coordinates of a resulting largest defect-free area whose dimensions (width, length) must be larger than the minimal dimensions of any additional part that may be included. Once the largest defect-free area has been established, it is then possible to place one or more successive additional parts either horizontally or vertically according to the following algorithm:

```
RepeatX=0
RepeatY=0
AvailLength=GetLength(DefectFreeArea)
AvailWidth=GetWidth(DefectFreeArea)
NumPart=GetNumPart(Order)
FROM i=PartStartIndex to i=PartEndIndex
{
    Part=GetPart,(Order,i)
    PartLength=GetLength(Part)
    PartWidth=GetWidth(Part)
    RepeatX=AvailLength/PartLength
    RepeatY=AvailWidth/productWidth
    IF RepeatX <> 0 and RepeatY <> 0
    {
        RemainWidth=AvailWidth
        RemainLength=AvailLength
        WHILE RemainLength>=PartLength
        {
            WHILE RemainWidth>=PartWidth
```

-continued

```
            {
                Add a subsection
                    Add a part
            }
        }
    }
}
``` wherein:

RepeatX is a parameter whose value corresponds to the number of times the length of a current part can fit within the available length along second axis X by a currently processed defect-free area;

RepeatY is a parameter whose value represents the number of times the width of a current part fits within the length defined along the first reference axis Y by the currently processed defect-free area;

DefectFreeArea is a parameter identifying the currently processed defect-free area;

GetLength(DefectFreeArea) designates a function allowing to retrieve the length value of a currently process defect-free area;

GetWidth(DefectFreeArea) designates a function allowing to retrieve the width value of a currently processed defect-free area;

GetNumPart(Order) designates a function allowing to retrieve the number of parts included in a current cutting bill;

RemainWidth represents the width value defined by a remaining surface portion of the defect-free area under processing; and RemainLength represents the length value defined by the remaining portion of the defect-free area.

Figure 16:
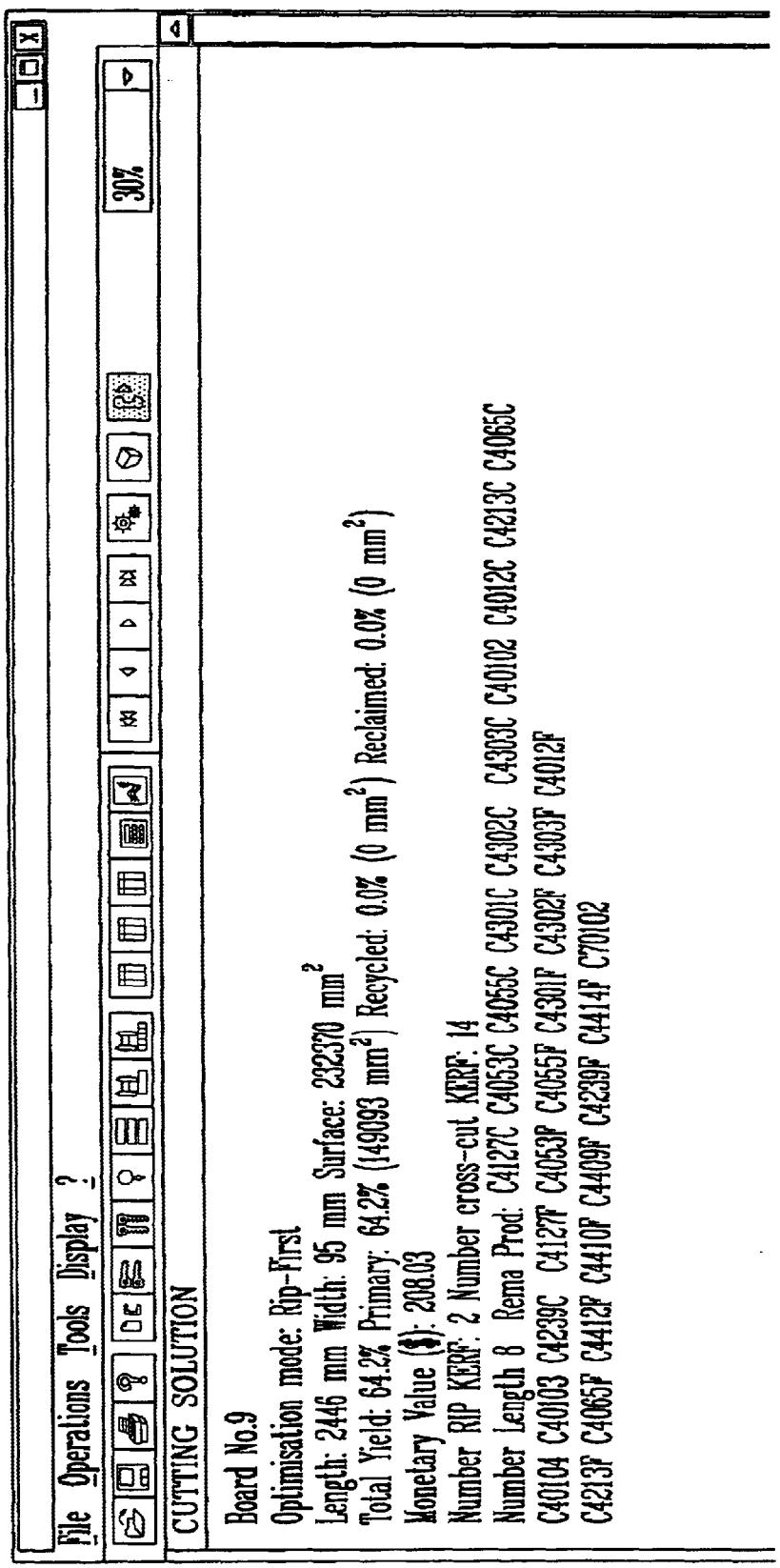
FIG. 16 is a representation of a graphical display screen as generated by computer software provided by the present invention, showing the result of the first data translating step set forth in FIG. 2.
Figure 17:
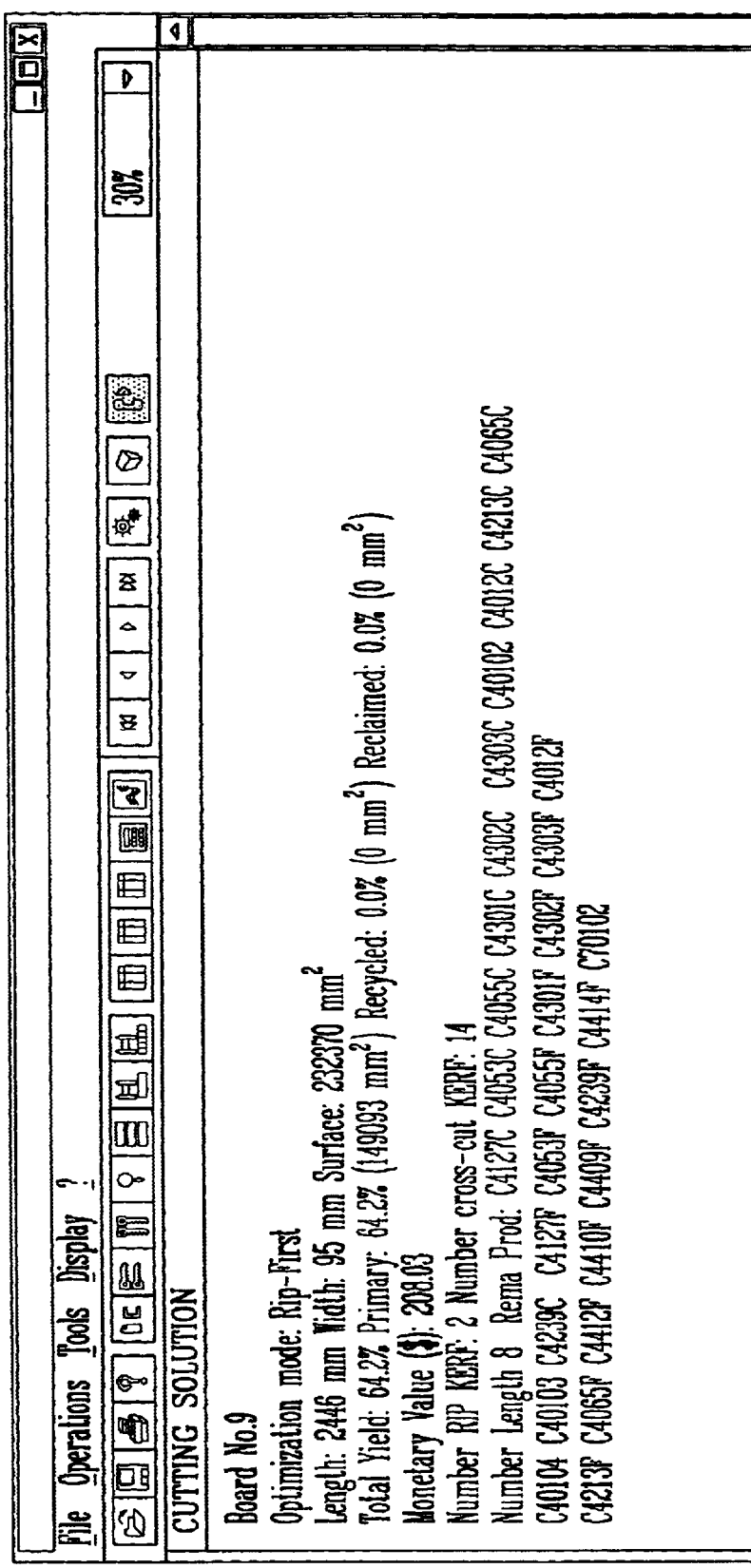
FIG. 17 is a representation of the graphical display screen as generated by computer software performing the method according to the invention, showing the result of the second data translating step set forth in FIG. 2.
Figure 18:
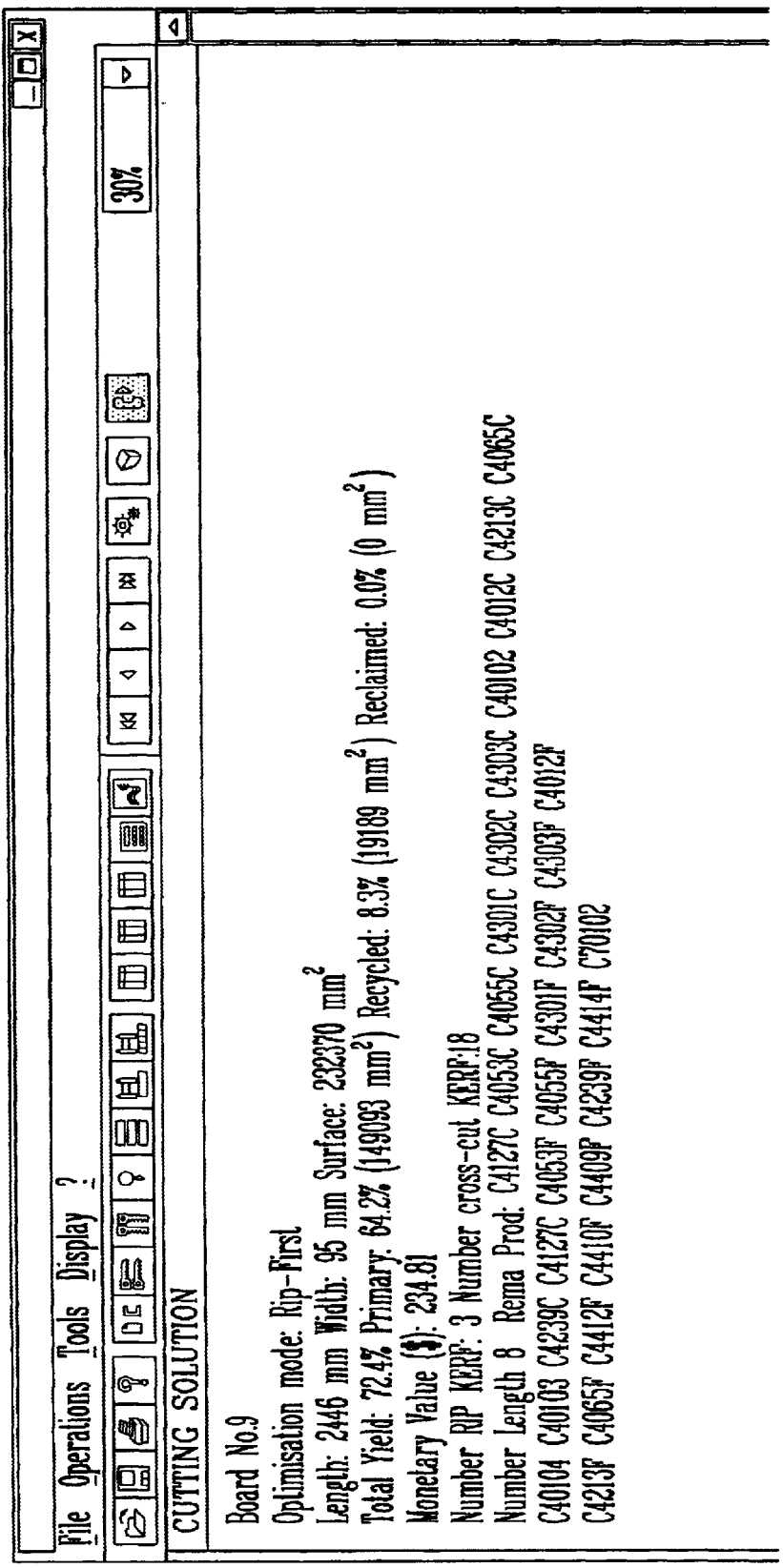
FIG. 18 is a representation of the graphical display screen as generated by computer software performing the method according to the invention, showing the result of alternate translation carried out at a last step set forth in FIG. 2.
Figure 19:
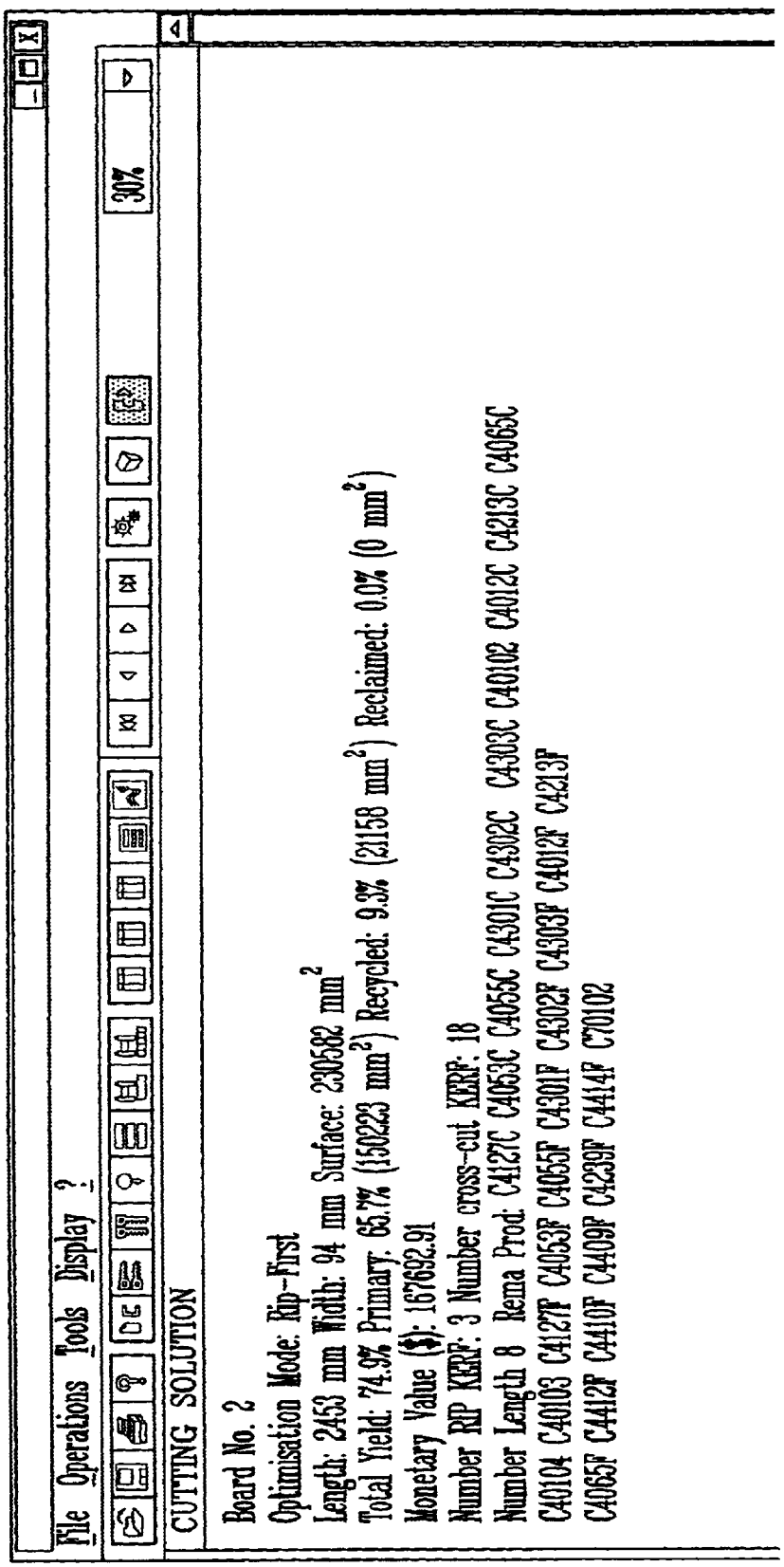
FIG. 19 represents a graphical display screen generated by computer software, showing the layout of selected parts to be cut according to the selected arrangements of parts maximizing the yield value along with specific information related to each selected part.

The algorithm set forth above corresponds to method step 122 shown in the process flow diagram of FIG. 1c, which consists of generating data defining, for at least some of the free areas, one or more additional parts to be included therein and selected from the further subset of parts, which step 122 is preferably performed according to a series of three sub-steps 124, 125 and 126 executed in sequence as shown in FIG. 2. At first sub-step 124, data defining arrangements of parts providing a maximal basic yield value is translated in a first direction along the second reference axis within corresponding subsections to extend the free areas, and the additional parts from the further subsets of parts are selected accordingly. The effect of such translation in the context of a rip-first optimization mode is shown in FIG. 16 as part of a computer display screen, wherein each of selected parts 128 and 129 as a result of the primary selection process has been translated in the direction of X axis in order to extend free areas 130, 131 respectively adjacent selected parts 128, 129, prior to proceed with the selection of the additional parts from the further subset of parts as described before. In the example shown in FIG. 16, none of the listed remaining parts has been found to satisfy the dimensional requirements characterizing defect-free areas 130 and 131, and therefore the secondary selection process does not contribute to the total basic surface yield obtained through the primary selection. At following sub-step 125 shown in FIG. 2, the resulting data is further translated in a second direction opposed to the first direction along the second reference X axis within-corresponding subsections to further extend the free areas, prior to selecting new additional parts from the further subset of parts as explained before. As shown in FIG. 17, the translation of selected parts 128, 129 in the left direction toward the origin of axis X gives the opportunity to use further defect-free areas 132, 133 respectively adjacent to selected parts 128, 129. Sometimes, selected parts translation to the left may not necessarily provide surface yield increase when none of the remaining parts satisfies the dimensional requirements characterized by any of further defect-free areas 132 or 133. However, any insertion of additional parts resulting from the first translation step 124 may have an effect on following translation steps, and the intermediate translation step 125 is prerequisite to the following translation step 126 which will be now explained with reference to FIG. 18. At step 126 shown in FIG. 2, further translating the data defining one ore more of said parts and resulting from said step b) in said first direction within corresponding said subsections to further extend said free areas, and selecting new said additional parts from said further subset-of parts accordingly. The data defining part 129 resulting from prior translation step 125, is further translated in the first direction, i.e. to the right along axis X, within corresponding subsection, allowing to selecting new additional parts 135, 136 from the further subset of parts to be included within the defect-free area extended as a result of the further translation applied at step 126, as new way to further extend available inter-subsection surface areas. It is to be understood that the further translation of step 126 in the first direction may be applied to more than one part, dependent on the number of subsections involved. FIG. 19 represents a cutting solution display screen generated by the computer software in the context of another optimization process example, showing the resulting selected parts layout for both faces 117, 117' along with specific information related to each selected part in the form of a table 119. The computer software may also be program to display other complementary data related to specific selected part, such as production identification number, position data ($X_{MIN}$, $X_{MAX}$, $Y_{MIN}$, $Y_{MAX}$) and surface data.

Turning now to FIGS. 7 and 8, the two-face approach for the segmentation of each piece surface section into subsections will be now explained in greater detail. In order to perform accurate generation of arrangements of parts to be included in each subsection generated by the process, while incorporating into the layout highest grade parts, an analysis of the locations of defects is performed using the algorithm set out above, which considers both faces 73, 73' of a piece of lumber under processing. For so doing, a function according to which defects associated with a particular category known as single-face category can be considered by the computer software as desired by the operator. As can be seen on FIGS. 7 and 8, each piece section of raw material shown has first and second opposed faces 73, 73' which are preferably chosen as the main faces of the piece of lumber, wherein the data representing geometric and defect-related characteristics of the piece generated in step 71 of the flow diagram of FIG. 1a, includes data characterizing each of faces 73, 73' wherein defect-related characteristics are defined according to predetermined defect types, each of which is associated with one of a plurality of defect acceptability categories including acceptable defect, single-face acceptable defect and an unacceptable defect categories as listed in the table displayed on the computer screen shown in FIG. 6, as explained before. In this context, the data generating step 71 shown in FIG. 1a is preferably performed so that substantially none of the subsections designated at 81, 83, 85 for first face 73 and by 81', 83', 85' for second face 73' of the piece section represented in FIG. 7, includes two (2) defects associated with the single-face category respectively present on first and second faces 73, 73', while sharing a same portion or subsection 83 of the piece section of raw material. It can be seen from FIG. 7 that none of the single-face acceptable defects 96 appearing onto first face 73 has corresponding defects associated with the single-face category present onto the second face 73' as part of the same subsection designated at 83, 83'. It can also be seen that the single-face acceptable defect 96' appearing on second face 73' does not correspond to any such single-face acceptable defect appearing onto first face 73 at the same subsection designated at 85, 85'.

Turning now to FIG. 8, it can be seen that the above-mentioned condition is not satisfied in respect of single-face acceptable defects designated at 97, 97' appearing respectively onto first face 73 and second face 73' of the piece section shown, since the two single-face acceptable defects 97, 97' share a same section area designated at 88, 88'. The computer software causes the shared portion to be removed by placing a secondary cutting axis 101 at $X_{MAX}$ location with respect to X axis shown in FIG. 8. It can be appreciated that the remaining defect portions 99, 99' respectively associated with subsections 83 and 85' now comply with the above-mentioned condition. It can be seen from both FIGS. 7 and 8 that the presence of an unacceptable defect 100 on first face 73 causes the computer software to generate secondary cutting lines 75, 77 even if no defect appears onto a corresponding portion 102 of second face 73. All unacceptable defects systematically cause the computer software to generate a secondary cutting line to define the end portion of a current portion, and a further secondary cutting line to define the beginning of a following subsection. However, when a first encountered single-face acceptable defect is identified as well as the specific face onto such first defect is found, the computer software does not generate a secondary cutting line. Any following single-face acceptable defects appearing on the same face as that of first find single-face acceptable defect are ignored until another single-face acceptable defect is found onto the opposed face so as to generate a secondary cutting line to complete the current subsection. In other words, in cases where two or more defects are aligned one with another while being not present onto the same face, as shown in the example of FIG. 8, the $X_{MAX}$ limit associated with the defect present on a given face which precedes an aligned defect present onto the other face is used to determine the next border of the current subsection.

Turning back to FIG. 1c, following data generating step 122 is a comparing step represented by condition checking block 135 according to which the current grade value i, is compared to the predetermined number n of grades, and whenever the such limit is not reached, the current grade value i is incremented at step 137 prior to the repetition of step 118 through connection C-2, to define a further subset from the set of parts characterized by the further predetermined grade value i=i+1. Data generating steps 120 and 122 are then performed in a same manner as explained before, and the condition set forth in block 135 is applied again with the current value of i. Whenever i=n, additional yield values associated with the inclusion of the additional parts resulting from the recycling function applied to the current optimization mode for the n grade values are estimated at step 139. Turning now to FIG. 1d, whenever the recycling function considers more than one basic optimization mode, according an affirmative output generated at condition checking block 141, the sequence of recycling steps is repeated from the initial step 116 whereby a new optimization mode is set as the current optimization mode as indicated by connection C-1. Whenever there is no further optimization mode to consider as tested at 141, resulting additional yield values associated with all tested optimization modes are compared at step. 143, to select the additional parts providing a maximal additional yield value.

Referring now to FIG. 1e, an optional function allowing the incorporation, into the optimized solution providing a maximal yield value, of further additional elements of various dimensions, which function is called a reclaiming function, will now be presented. Primary placement of parts as well as secondary placement of recycled parts may still leave free areas made of unused raw material, within some sections of a processed piece of lumber. The reclaiming function programmed in the computer software consists of inserting one or more additional elements of various dimensions, within predetermined limits, whenever the criteria associated with the reclaimed grade, i.e. whether particular types of defects present onto the section under processing are acceptable, are met. Since predetermined dimensional characteristics are not specified, the set of parts defined by the current cutting bill need not to be considered. In other words, the reclaiming function involves an all-length/all-width approach for additional element placement. More specifically, as shown in FIG. 1e, the reclaiming function involves a step 145 consisting of generating data defining, for each arrangement of parts in each subsection included in each piece surface section and providing a maximal basic yield value, one or more remaining free areas according to the geometric and defect-related characteristics of the piece. Then, there is provided a step 147 consisting of generating data defining, for at least some of the remaining free areas, one or more reclaimed elements to be included therein as part of the optimized layout of selected parts to be cut. Finally, additional yield values associated with the inclusion of the reclaimed elements can be estimated at step 149.

A mentioned before, the computer software has access to a replacement parts data file selected for the current simulation processing, which is used to replace a part having been selected in a layout, and therefore withdrawn from the active set of parts, by a new required part listed in the current cutting bill, taken from an inactive portion thereof. Such replacement function may be performed according to the replacement priority indicator value given to each part type, on the basis of anyone of the following rules: (1) a replacing part must be of a same grade, same production and of substantially a same dimension (length or width) within a predetermined dimension range, than those of the replaced part; (2) a replacing part must be of a same grade, same production, and of the nearest dimension (length or width), than those of the replaced part; (3) a replacing part must be of a same grade and of substantially a same dimension (length or width) within a predetermined dimension range, than those of the replaced part; and (4) a replacing part must be of a same grade and of the nearest dimension (length or width), than those of the replaced part. It must be understood other rules allowing that a replacing part be of higher or lower grade, or allowing a replacing part be of a different type, may be established. Preferably, the replacement function must ensure to maintain a minimum, predetermined number of parts of each type in the active set. One approach to meet such object consists of applying weighing factors to the estimated area of each selected part, whose values are chosen within a "0–1" range depending upon the priority given to each type of parts. In the particular case of panel. cutting optimization, a high weighing factor value for paneling may increase the resulting yield while causing the production of fixed-sized components to decrease. In such case, a lower value for the minimum yield reference would allow faster placement of components. Weighing factors associated with individual parts can also be considered in the comparison of optimization trial solutions, wherein the maximal basic yield values thereof are compared one with another to select the arrangement of subdivided piece surface sections providing a highest maximal basic yield value, as explained before. The weighing factors are used along with comparison rules according to which the primary and secondary (recycled) yield values, or a combination thereof, is considered in the selection of the final solution, either on the basis of surface or economic value yields.

Turning now to FIG. 20, a simulation results display screen generated by computer software is shown, giving a list of parameters related the current simulation process, including selected grade for primary optimization and resulting yield data for each grade considered. Referring to FIG. 21, a production results display screen generated by the computer software is shown, giving simulation related data such as name of simulation, optimization mode, number of pieces involved, number of parts selected, input surface of pieces, part surface generated and monetary value ($), along with a table presenting production data related to each part selected, namely: part code, product type, quantity produced, surface generated, surface percentage of input surface, and piece input surface.

We claim:

1. A method of optimizing a layout of selected parts to be cut from a piece of raw material with respect to first and second orthogonal reference axis, using data representing geometric and defect-related characteristics of said piece and data representing geometric and grade characteristics of a set of parts to be cut, said method comprising the steps of:
   i) defining a subset of said set of parts characterized by a predetermined grade value and associated with a predetermined group of first dimension values defined with respect to said first axis;
   ii) generating data defining an arrangement of subdivided piece surface sections to be obtained through a primary cutting operation with respect to said second reference axis and according to one or more of said first dimension values;
   iii) generating data defining one or more subsections included in each said piece surface section according to said geometric and defect-related characteristics of said piece;
   iv) generating data defining for each said subsection a plurality of arrangements of parts to be included therein and selected from said subset of parts, to be obtained through a secondary cutting operation with respect to said first reference axis;
   v) estimating yield values associated with said arrangements of parts;
   vi) comparing said yield values to select one of said arrangements of parts having a highest yield value;

vii) estimating a basic yield value for said arrangement of subdivided piece surface sections;

viii) repeating said steps ii) to vii) for one or more new arrangements of subdivided piece surface sections to estimate corresponding basic yield values; and ix) comparing all said basic yield values one with another to select said arrangement of subdivided piece surface sections associated with said arrangements of parts providing a maximal basic yield value to be included in said optimized layout of selected parts to be cut.

2. The method of claim 1, wherein said piece is an elongate piece having its longitudinal axis parallel to said second reference axis, said piece having its transverse axis parallel to said first reference axis.

3. The method of claim 1, wherein said piece is an elongate piece having its longitudinal axis parallel to said first reference axis, said piece having its transverse axis parallel to said second reference axis.

4. The method of claim 1, further comprising the steps of:

x) comparing said maximal basic yield value with a predetermined minimum yield reference value associated with said predetermined grade, and, whenever said maximal basic yield value is lower than said minimum yield reference value, performing the steps of:

xi) defining a further subset of said set of parts characterized by a further predetermined grade value and associated with a further predetermined group of first dimension values defined with respect to said first axis;

xii) repeating said steps ii) to ix) to estimate a further maximal yield value associated with said further predetermined grade value for corresponding said arrangement of subdivided piece surface sections;

xiii) comparing said maximal basic yield values one with another to select said arrangement of subdivided piece surface sections providing a highest maximal basic yield value to be included in said optimized layout of selected parts to be cut.

5. The method of claim 4, wherein said step ii) to xiii) are performed within a predetermined processing time limit until said arrangement of subdivided piece surface sections providing a highest maximal basic yield is obtained.

6. The method of claim 1, wherein said predetermined grade value is a first one of a group of n predetermined grade values of decreasing cutting priority order i=1,n, for each said predetermined grade value i=2, n, the method further comprising the steps of:

x) comparing said maximal basic yield value with a predetermined minimum yield reference value associated with said first predetermined grade, and, whenever said maximal basic yield value is lower than said minimum yield reference value, performing the steps of:

xi) defining a further subset of said set of parts characterized by said predetermined grade value i and associated with a corresponding further predetermined group of first dimension values defined with respect to said first axis;

xii) repeating said steps ii) to ix) to estimate a further maximal yield value associated with said predetermined grade value i for corresponding said arrangement of subdivided piece surface sections;

xiii) comparing said maximal basic yield values one with another to select said arrangement of subdivided piece surface sections providing a highest maximal basic yield value to be included in said optimized layout of selected parts to be cut.

7. The method of claim 6, wherein said step ii) to: xiii) are performed within a predetermined processing time limit until said arrangement of subdivided piece surface sections providing a highest maximal basic yield is obtained.

8. The method of claim 1, wherein said piece is an elongate piece defining longitudinal and transverse axis, said first and second orthogonal reference axis defining one of a first and second optimization mode, said longitudinal and transverse axis being respectively parallel to said second and first reference axis according to said first optimization mode, said longitudinal and transverse axis being respectively parallel to said second and first reference axis according to said second optimization mode, said steps i) to ix) being first performed according to said first optimization mode, the method further comprises the steps of:

x) selecting said second optimization mode;

xi) repeating said steps i) to ix) to obtain corresponding said arrangement of subdivided piece surface sections associated with corresponding said arrangements of parts providing a maximal basic yield value according to said second optimization mode; and xii) comparing the maximum basic yield values resulting from said steps ix) and xi) obtained according to said first and second optimization modes respectively, to select said arrangement of parts providing a maximal basic yield value to be included in said optimized layout of selected parts to be cut.

9. The method of claim 1, wherein said predetermined grade value is a first one of a group of n predetermined grade values of decreasing cutting priority order i=1,n, for each said predetermined grade value i=1,n, the method further comprising the steps of:

x) defining a further subset of said set of parts characterized by said predetermined grade value i;

xi) generating data defining, for each said arrangement of parts in each said subsection included in each said piece surface section and providing a maximal basic yield value, one or more free areas according to said geometric and defect-related characteristics of said piece;

xii) generating data defining, for at least some of said free areas, one or more additional parts to be included therein and selected from said further subset of parts, as part of said optimized layout of selected parts to be cut.

10. The method of claim 9, further comprising the step of:

xiii) estimating additional yield values associated with the inclusion of said additional parts.

11. The method of claim 9, wherein said additional parts are to be obtained through secondary and tertiary cutting operations with respect to said first and second reference axis, respectively.

12. The method of claim 9, wherein said piece is an elongate piece having its longitudinal axis being parallel to said second reference axis, said step xii) including the steps of:

a) translating said data defining said arrangements of parts providing a maximal basic yield value in a first direction along said second reference axis within corresponding said subsections to extend said free areas, and selecting said additional parts from said further subset of parts accordingly;

b) translating the data resulting from said step a) in a second direction opposed to said first direction along said second reference axis within corresponding said subsections to further extend said free areas, and selecting new said additional parts from said further subset of parts accordingly; and c) further translating the data defining one ore more of said parts and resulting from said step b) in said first direction within corresponding said subsections to further extend said free areas, and selecting new said additional parts from said further subset of parts accordingly.

13. The method of claim 12, wherein said additional parts are to be obtained through secondary and tertiary cutting operations with respect to said first and second reference axis, respectively.

14. The method of claim 9, further comprising the steps of:
   xiii) generating data defining, for each said arrangement of parts in each said subsection included in each said piece surface section and providing a maximal basic yield value, one or more remaining free areas according to said geometric and defect-related characteristics of said piece; and
   xiv) generating data defining, for at least some of said remaining free areas, one or more reclaimed elements to be included therein as part of said optimized layout of selected parts to be cut.

15. The method of claim 14, further comprising the step of:
   xv) estimating additional yield values associated with the inclusion of said reclaimed elements.

16. The method of claim 9, wherein said predetermined grade value is a first one of a group of n predetermined grade values of decreasing cutting priority order i=1,n, wherein said piece is an elongate piece defining longitudinal and transverse axis, said first and second orthogonal reference axis defining one of a first and second optimization mode, said longitudinal and transverse axis being respectively parallel to said second and first reference axis according to said first optimization mode, said longitudinal and transverse axis being respectively parallel to said second and first reference axis according to said second optimization mode, said steps i) to ix) being first performed according to said first optimization mode, the method further comprising, for each said predetermined grade value i=1,n, the steps of:
   x) defining a further subset of said set of parts characterized by said predetermined grade value i;
   xi) generating data defining, for each said arrangement of parts in each said subsection included in each said piece surface section and providing a maximal basic yield value, one or more free areas according to said geometric and defect-related characteristics of said piece; and
   xii) generating data defining, for at least some of said free areas, one or more additional parts to be included therein and selected from said further subset of parts; said method further comprising the steps of:
   xiii) estimating additional yield values associated with said additional parts;
   xiv) repeating said steps x) to xii) according to said second optimization mode and estimating additional yield values associated with corresponding said additional parts;
   xv) comparing the additional yield values resulting from said steps xiii) and xiv) respectively, to select said additional parts providing a maximal additional yield value, to be included in said optimized layout of selected parts to be cut.

17. The method of claim 16, further comprising the steps of:
   xvi) generating data defining, for each said arrangement of parts in each said subsection included in each said piece surface section and providing a maximal basic yield value, one or more remaining free areas according to said geometric and defect-related characteristics of said piece; and
   xvii) generating data defining, for at least some of said remaining free areas, one or more reclaimed elements to be included therein as part of said optimized layout of selected parts to be cut.

18. The method of claim 1, wherein said piece of raw material has at least first and second opposed faces, said data representing geometric and defect-related characteristics of said piece including data characterizing each said first and second opposed faces, said defect-related characteristics being defined according to predetermined defect types each of which being associated with one of a plurality of defect acceptability categories including acceptable defect, single-face acceptable defect and unacceptable defect categories, said data generating step iii) being performed so that substantially none of said subsections includes two defects associated with the single-face category and respectively present on said first and second faces.

19. A software product data recording medium in which program code is stored, which program code will cause a computer to perform a method of optimizing a layout of selected parts to be cut from a piece of raw material with respect to first and second orthogonal reference axis, using data representing geometric and defect-related characteristics of said piece and data representing geometric and grade characteristics of a set of parts to be cut, said method comprising the steps of:
   i) defining a subset of said set of parts characterized by a predetermined grade value and associated with a predetermined group of first dimension values defined with respect to said first axis;
   ii) generating data defining an arrangement of subdivided piece surface sections to be obtained through a primary cutting operation with respect to said second reference axis and according to one or more of said first dimension values;
   iii) generating data defining one or more subsections included in each said piece surface section according to said geometric and defect-related characteristics of said piece;
   iv) generating data defining for each said subsection a plurality of arrangements of parts to be included therein and selected from said subset of parts, to be obtained through a secondary cutting operation with respect to said first reference axis;
   v) estimating yield values associated with said arrangements of parts;
   vi) comparing said yield values to select one of said arrangements of parts having a highest yield value;
   vii) estimating a basic yield value for said arrangement of subdivided piece surface sections;
   viii) repeating said steps ii) to vii) for one or more new arrangements of subdivided piece surface sections to estimate corresponding basic yield values; and
   ix) comparing all said basic yield values one with another to select said arrangement of subdivided piece surface sections associated with said arrangements of parts providing a maximal basic yield value to be included in said optimized layout of selected parts to be cut.

* * * * *

UNITED STATES PATENT AND TRADEMARK OFFICE
CERTIFICATE OF CORRECTION

PATENT NO. : 6,690,990 B1
DATED : February 10, 2004
INVENTOR(S) : Martin Caron et al.

It is certified that error appears in the above-identified patent and that said Letters Patent is hereby corrected as shown below:

Drawings
Fig. 21, the term "valve" should read -- value --.

Column 2,
Line 66, the terms "which consider" should read -- that considers --;

Column 7,
Line 19, the term "A" should read -- As --;

Column 14,
Line 49, the element "[DecompIndex" should read -- [DecompIndex] --;

Column 22,
Line 61, the numeral "85" should read -- 95 --;

Column 29,
Lines 32-33, the term "select-ing" should read -- select --;
Line 45, the term "program" should read -- programmed --;

Column 31,
Line 48, the term "A" should read -- As --.

Signed and Sealed this

Twenty-first Day of June, 2005

JON W. DUDAS
*Director of the United States Patent and Trademark Office*